(12) United States Patent
Wang et al.

(10) Patent No.: US 11,397,475 B2
(45) Date of Patent: Jul. 26, 2022

(54) DISPLAY DEVICE, ELECTRONIC DEVICE AND METHOD FOR DRIVING DISPLAY DEVICE

(71) Applicant: BOE TECHNOLOGY GROUP CO., LTD., Beijing (CN)

(72) Inventors: Pengpeng Wang, Beijing (CN); Haisheng Wang, Beijing (CN); Xiaoliang Ding, Beijing (CN); Wenqing Zhao, Beijing (CN); Yangbing Li, Beijing (CN); Yapeng Li, Beijing (CN); Likai Deng, Beijing (CN); Yuanyuan Ma, Beijing (CN); Lei Wang, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 240 days.

(21) Appl. No.: 16/633,952

(22) PCT Filed: Jan. 14, 2019

(86) PCT No.: PCT/CN2019/071654
§ 371 (c)(1),
(2) Date: Jan. 24, 2020

(87) PCT Pub. No.: WO2020/146981
PCT Pub. Date: Jul. 23, 2020

(65) Prior Publication Data
US 2021/0216148 A1    Jul. 15, 2021

(51) Int. Cl.
*G06F 3/03* (2006.01)
*G02F 1/29* (2006.01)
*H04N 5/225* (2006.01)

(52) U.S. Cl.
CPC .............. *G06F 3/0304* (2013.01); *G02F 1/29* (2013.01); *H04N 5/2257* (2013.01)

(58) Field of Classification Search
CPC ........ G06F 3/0304; G02F 1/29; H04N 5/2257
(Continued)

(56) References Cited

U.S. PATENT DOCUMENTS 8,736,584 B2 * 5/2014 Hata ..................... G06F 3/0421
345/175
2012/0070070 A1    3/2012 Litvak
(Continued)

FOREIGN PATENT DOCUMENTS

CN    102681183 A    9/2012
CN    103905808    *    7/2014    ............... G06F 3/01
(Continued)

OTHER PUBLICATIONS

Teranuma Osamu et al. Display Device and Backlight Device Feb. 1, 2007 Derwent WO 2007013272 English Figures 2-5, Abstract, Paragraphs 14, 15, 24-26,29-35, 40, 50-51, 58-65.*
(Continued)

*Primary Examiner* — Prabodh M Dharia
(74) *Attorney, Agent, or Firm* — Collard & Roe, P.C.

(57) ABSTRACT

A display device, an electronic device, and a method for driving a display device are provided. The display device includes a display panel and a plurality of image sensors. The display panel has a display side and a back side opposite to the display side, the plurality of image sensors are independent at a plurality of independent positions on the back side of the display panel, and the plurality of image sensors are configured to integrally obtain depth image information of a target to be detected on the display side of the display panel.

19 Claims, 13 Drawing Sheets

(58) Field of Classification Search
USPC .............................. 345/156, 690, 175; 348/50
See application file for complete search history.

(56) References Cited

U.S. PATENT DOCUMENTS

| | | | |
|---|---|---|---|
| 2014/0184754 A1* | 7/2014 | Suh | H04N 13/232 |
| | | | 348/50 |
| 2015/0035873 A1* | 2/2015 | Shima | G09G 3/3607 |
| | | | 345/690 |
| 2018/0157056 A1* | 6/2018 | Liu | G02B 30/52 |
| 2020/0052030 A1 | 2/2020 | Wu | |
| 2020/0068191 A1 | 2/2020 | Yu et al. | |

FOREIGN PATENT DOCUMENTS

| | | |
|---|---|---|
| CN | 103905808 A | 7/2014 |
| CN | 107884940 A | 4/2018 |
| CN | 108594249 A | 9/2018 |
| CN | 109040363 A | 12/2018 |

OTHER PUBLICATIONS

Teranuma Osamu et al. Display Device and Backlight Device Feb. 1, 2007 Derwent WO 2007013272; Japanese.*
International Search Report of PCT/CN2019/071654 in Chinese dated Sep. 26, 2019 with English translation.
International Search Report of PCT/CN2019/071654 in Chinese, dated Sep. 26, 2019.

* cited by examiner

DISPLAY DEVICE, ELECTRONIC DEVICE AND METHOD FOR DRIVING DISPLAY DEVICE

CROSS REFERENCE TO RELATED APPLICATIONS

This application is the National Stage of PCT/CN2019/071654 filed on Jan. 14, 2019, the disclosure of which is incorporated by reference.

TECHNICAL FIELD

Embodiments of the present disclosure relate to a display device, an electronic device, and a method for driving a display device.

BACKGROUND

In recent years, with development of science technology, the Internet of Things in which all things are interconnected has become a research focus. In a composition system of the Internet of Things, data required for implementing the interconnection of all things undoubtedly needs to be acquired by various sensors, and therefore, there are more and more demands for low-cost, highly integrated, and easy-to-use sensors. The wide application of the mobile electronic device, e.g., popularity of the mobile phone, has brought the modern society into a nationwide screen reading era. The display screen is integrated with various sensors and is configured to be both the output terminal and input terminal of information, which gradually becomes the mainstream form of next-generation technology products. Therefore, the integration of the display screen with various sensors becomes an important direction of technology development. With development of the three-dimensional (3D) technology, technology applications in aspects, such as the stereoscopic display, machine vision, satellite remote sensing, etc., increasingly need to obtain depth information of scenes. For example, a depth camera can obtain depth information of a target in the visual field of the camera.

SUMMARY

At least an embodiment of the present disclosure provides a display device, and the display device includes a display panel and a plurality of image sensors. The display panel has a display side and a back side opposite to the display side, the plurality of image sensors are independent at a plurality of independent positions on the back side of the display panel, and the plurality of image sensors are configured to integrally obtain depth image information of a target to be detected on the display side of the display panel.

For example, in the display device provided by an embodiment of the present disclosure, the display panel includes a display region and a non-display region around the display region, and the plurality of image sensors are arranged in the display region and/or the non-display region of the display panel.

For example, in the display device provided by an embodiment of the present disclosure, each of the plurality of image sensors includes a plurality of pixel units or one single pixel unit.

For example, the display device provided by an embodiment of the present disclosure further includes a plurality of liquid crystal lenses, the plurality of liquid crystal lenses are in an overlapping arrangement with the plurality of image sensors in one-to-one correspondence in a direction perpendicular to a surface of the display side of the display panel, and the plurality of liquid crystal lenses are configured to allow light from outside the display side of the display panel to be transmitted to the plurality of image sensors after passing through the plurality of liquid crystal lenses, respectively.

For example, the display device provided by an embodiment of the present disclosure further includes a liquid crystal panel, the liquid crystal panel includes the plurality of liquid crystal lenses and is stacked with the display panel, the liquid crystal panel is on the back side of the display panel, the plurality of image sensors are on a side, away from the display panel, of the liquid crystal panel, and in the direction perpendicular to the surface of the display side of the display device, the liquid crystal panel is provided with a plurality of first openings corresponding to the plurality of image sensors.

For example, in the display device provided by an embodiment of the present disclosure, the liquid crystal panel includes a first control electrode layer, a liquid crystal layer, and a second control electrode layer which are sequentially stacked, and the first control electrode layer and the second control electrode layer are configured to adjust rotation angles of liquid crystal molecules in the liquid crystal layer, so as to implement a lens effect of the plurality of liquid crystal lenses.

For example, the display device provided by an embodiment of the present disclosure further includes at least one detection light source, and the detection light source is configured to emit detection light to the display side of the display panel, so as to allow the plurality of image sensors to image based on the detection light reflected by the target to be detected.

For example, in the display device provided by an embodiment of the present disclosure, the liquid crystal panel further includes a first substrate, and the first substrate is on the side, away from the display panel, of the liquid crystal panel. The detection light source is on a side, close to the display panel, of the first substrate; or the detection light source is on a side, away from the display panel, of the first substrate, and the first substrate includes a second opening corresponding to the detection light source, so as to allow light emitted by the detection light source to pass through the second opening.

For example, the display device provided by an embodiment of the present disclosure further includes a liquid crystal panel, the liquid crystal panel includes the plurality of liquid crystal lenses and is stacked with the display panel, the liquid crystal panel is on the display side of the display panel, the plurality of image sensors are on a side, away from the liquid crystal panel, of the display panel, and in the direction perpendicular to the surface of the display side of the display device, the display panel is provided with a plurality of first openings corresponding to the plurality of image sensors.

For example, in the display device provided by an embodiment of the present disclosure, the liquid crystal panel includes a first control electrode layer, a liquid crystal layer, and a second control electrode layer which are sequentially stacked, and the first control electrode layer and the second control electrode layer are configured to adjust rotation angles of liquid crystal molecules in the liquid crystal layer, so as to implement a lens effect of the plurality of liquid crystal lenses.

For example, in the display device provided by an embodiment of the present disclosure, the display panel is an organic light-emitting diode display panel.

For example, the display device provided by an embodiment of the present disclosure further includes at least one detection light source, and the detection light source is configured to emit detection light to the display side of the display panel, so as to allow the plurality of image sensors to image based on the detection light reflected by the target to be detected.

For example, in the display device provided by an embodiment of the present disclosure, the display panel further includes a second substrate, and the second substrate is on the side, away from the liquid crystal panel, of the display panel. The detection light source is on a side, close to the liquid crystal panel, of the second substrate; or the detection light source is on a side, away from the liquid crystal panel, of the second substrate, and the second substrate includes a second opening corresponding to the detection light source, so as to allow light emitted by the detection light source to pass through the second opening.

For example, in the display device provided by an embodiment of the present disclosure, the display panel is a liquid crystal panel, the liquid crystal panel includes a first portion configured to implement the plurality of liquid crystal lenses, and a second portion configured to implement a plurality of display pixels, and in the direction perpendicular to the surface of the display side of the display device, the liquid crystal panel is provided with a plurality of first openings corresponding to the plurality of image sensors.

For example, in the display device provided by an embodiment of the present disclosure, at least part of the display pixels of the liquid crystal panel serve as the liquid crystal lenses.

For example, in the display device provided by an embodiment of the present disclosure, the first portion of the liquid crystal panel includes a first control electrode layer, a liquid crystal layer, and a second control electrode layer which are sequentially stacked, and the first control electrode layer and the second control electrode layer are configured to adjust rotation angles of liquid crystal molecules in the liquid crystal layer, so as to implement a lens effect of the plurality of liquid crystal lenses.

For example, the display device provided by an embodiment of the present disclosure further includes at least one detection light source, and the detection light source is configured to emit detection light to a display side of the display device, so as to allow the plurality of image sensors to image based on the detection light reflected by the target to be detected.

For example, in the display device provided by an embodiment of the present disclosure, the detection light source is on the display side of the display device; or the detection light source is on the back side of the liquid crystal panel, and in the direction perpendicular to the surface of the display side of the display device, the liquid crystal panel includes a second opening corresponding to the detection light source, so as to allow light emitted by the detection light source to pass through the second opening.

For example, the display device provided by an embodiment of the present disclosure further includes a backlight source, the backlight source is configured to provide display light to the liquid crystal panel, the plurality of image sensors are on a back side, opposite to the display side of the display panel, of the backlight source, and in the direction perpendicular to the surface of the display side of the display device, the backlight source includes a plurality of third openings corresponding to the plurality of image sensors.

For example, in the display device provided by an embodiment of the present disclosure, the backlight source is a side-light-emitting backlight source, the side-light-emitting backlight source includes a first light source and a light guide plate, and the first light source is on an incident side of the light guide plate.

For example, in the display device provided by an embodiment of the present disclosure, the backlight source is a direct type backlight source, the direct type backlight source includes a light source backplane, and the light source backplane includes a plurality of second light sources.

For example, in the display device provided by an embodiment of the present disclosure, the light source backplane is a backplane including a self-luminous component.

For example, the display device provided by an embodiment of the present disclosure further includes at least one detection light source, and the detection light source is outside the display region of the display device and is configured to emit detection light to a display side of the display device, so as to allow the plurality of image sensors to image based on the detection light reflected by the target to be detected.

For example, in the display device provided by an embodiment of the present disclosure, the detection light source is on a surface of the display side of the display device.

For example, in the display device provided by an embodiment of the present disclosure, the detection light source emits modulated light, and the modulated light includes infrared light or laser.

For example, the display device provided by an embodiment of the present disclosure is further connected to a processor, and the processor is configured to merge image information acquired by the plurality of image sensors, so as to integrally obtain image information of the display side of the display panel.

At least an embodiment of the present disclosure further provides an electronic device, and the electronic device includes the display device provided by any one of the embodiments of the present disclosure.

At least an embodiment of the present disclosure further provides a method for driving the display device provided by any one of the embodiments of the present disclosure, and the method includes: driving at least one liquid crystal lens to transmit light from a selected scene to at least one image sensor which is corresponding, so as to determine a region where the target to be detected is located; and driving a plurality of liquid crystal lenses corresponding to the region where the target to be detected is located to transmit light from the region where the target to be detected is located to a plurality of image sensors which are corresponding, so as to obtain image information of the target to be detected.

For example, the method for driving the display device provided by an embodiment of the present disclosure further includes: driving the display panel to perform a display operation.

For example, the method for driving the display device provided by an embodiment of the present disclosure further includes: merging image information, acquired by the plurality of image sensors, of the target to be detected, and performing image depth detection on merged image information, so as to obtain depth information of the target to be detected.

For example, the method for driving the display device provided by an embodiment of the present disclosure further includes: performing calibration on the depth information, which is obtained, of the target to be detected according to rotation angles of liquid crystal molecules of the plurality of liquid crystal lenses.

BRIEF DESCRIPTION OF THE DRAWINGS

In order to clearly illustrate the technical solution of the embodiments of the present disclosure, the drawings of the embodiments will be briefly described in the following. It is obvious that the described drawings in the following are only related to some embodiments of the present disclosure and thus are not limitative of the present disclosure.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present application for disclosure, are not intended to indicate any sequence, amount or importance, but distinguish various components. Also, the terms such as "a," "an," etc., are not intended to limit the amount, but indicate the existence of at least one. The terms "comprise," "comprising," "include," "including," etc., are intended to specify that the elements or the objects stated before these terms encompass the elements or the objects and equivalents thereof listed after these terms, but do not preclude the other elements or objects.

Figure 1:
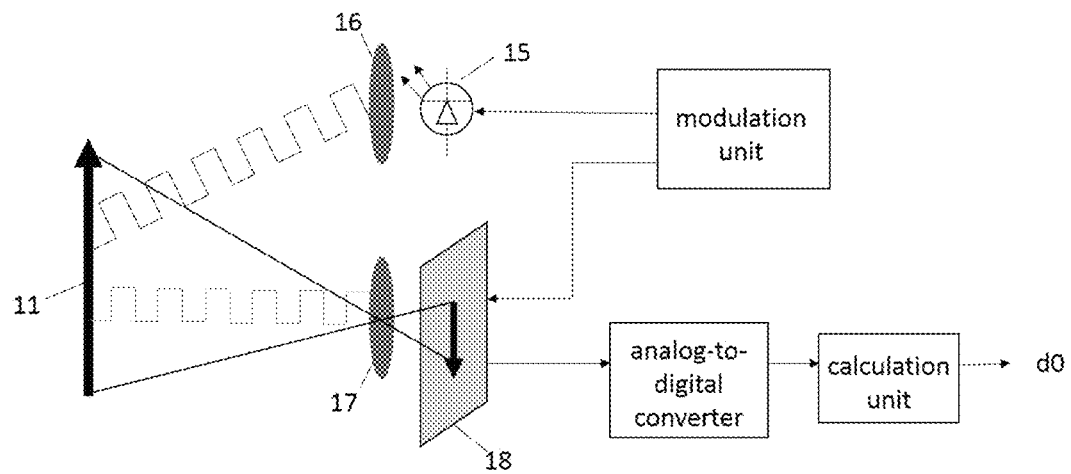
FIG. 1 is a schematic diagram of a time of flight (TOF) depth camera module detection system.

In the depth information detection technology, detection of depth information is usually implemented by using a depth camera. FIG. 1 is a schematic diagram of a time of flight (TOF) depth camera module detection system. As illustrated in FIG. 1, the detection system includes a light source 15, a receiving array 18, and a control circuit, and the control circuit includes a modulation unit, an analog-to-digital converter, and a calculation unit. Firstly, the modulation unit controls the light source 15 to emit a beam of modulated light (for example, infrared light), the infrared light is irradiated to a target 11 (for example, a human body)

through an optical component 16 (for example, a lens) and then is reflected by the target 11, the reflected infrared light is received by the receiving array 18 through another optical component 17 (for example, a lens) and is converted into an electric signal, then the modulation unit demodulates the electric signal corresponding to the received infrared light, the demodulated signal is subjected to analog-to-digital conversion by the analog-to-digital converter, and a distance value d0 from the target 11 to the TOF depth camera module is calculated according to the signal subjected to analog-to-digital conversion by the calculation unit.

The TOF depth camera module detection system uses an independent depth camera module, and measures a depth distance of the target 11 by calculating round trip time of the light, so as to implement determining a spatial position of the target 11. However, in the detection system, an optical image sensor used by the depth camera module generally is a silicon-based image sensor (for example, a complementary metal oxide semiconductor (CMOS) image chip), and a size of the silicon-based image sensor is very large and generally is on a centimeter (cm) magnitude. Therefore, the depth camera module is difficult to be miniaturized, and the depth camera module cannot be directly disposed in the display area of the display device, so that integration of the depth camera module with the display screen cannot be implemented. Moreover, for such large-sized optical image sensor, a corresponding optical lens is also difficult to produce, and large-scaled practical application cannot be implemented. Therefore, how to integrate the depth camera module with the display screen becomes a problem to be solved urgently.

Meanwhile, in the interactive application of 3D display, virtual reality (VR), augmented reality (AR), etc., multi-angle and multi-dimension spatial interactive information needs to be acquired and extracted, and interactive occlusion is an unavoidable problem, that is, no matter what angle the camera of the depth camera module uses, interactive occlusion can still occur in some scenes. Therefore, the accurate spatial interactive information is difficult to be obtained, and for example, the depth distance of the image cannot be accurately obtained, so that it is difficult to perform accurate spatial positioning.

At least an embodiment of the present disclosure provides a display device. According to the display device, one single large-sized image sensor is replaced with a plurality of small-sized image sensors, and the plurality of small-sized image sensors are arranged (for example, transferred) on the back of the display device, thereby solving the problem that the image sensor cannot be integrated with the display device because of the excessively large size of one single image sensor. Moreover, in at least an embodiment, the display device uses a liquid crystal lens formed by liquid crystals as an imaging lens, and flexibly controls rotation angles of liquid crystal molecules of the liquid crystal lens by utilizing the characteristics of optical anisotropy and dielectric anisotropy of the liquid crystals, so that each image sensor can receive depth image information in different directions. Thus, an image acquisition range of the image sensor is enlarged, the image sensor can acquire more accurate depth image information to implement accurate spatial positioning of the target, and meanwhile, the problem of interactive occlusion in the image acquiring process also can be solved.

At least an embodiment of the present disclosure further provides a method for driving the above display device and an electronic device including the above display device.

In the driving method of some embodiments, the depth image acquiring process of the display device includes two phases of a rough scanning phase and a precise scanning phase, so that in a case where the display device implements accurate spatial positioning of the target, the number of the image sensors in the display device is further reduced, the accurate image information of the target can be obtained by using as few image sensors as possible, thereby implementing high-accuracy spatial positioning.

Hereinafter, the embodiments of the present disclosure will be described in detail with reference to the accompanying drawings. It should be noted that the same reference numerals in different drawings will be used to indicate the same components described.

Figure 2:
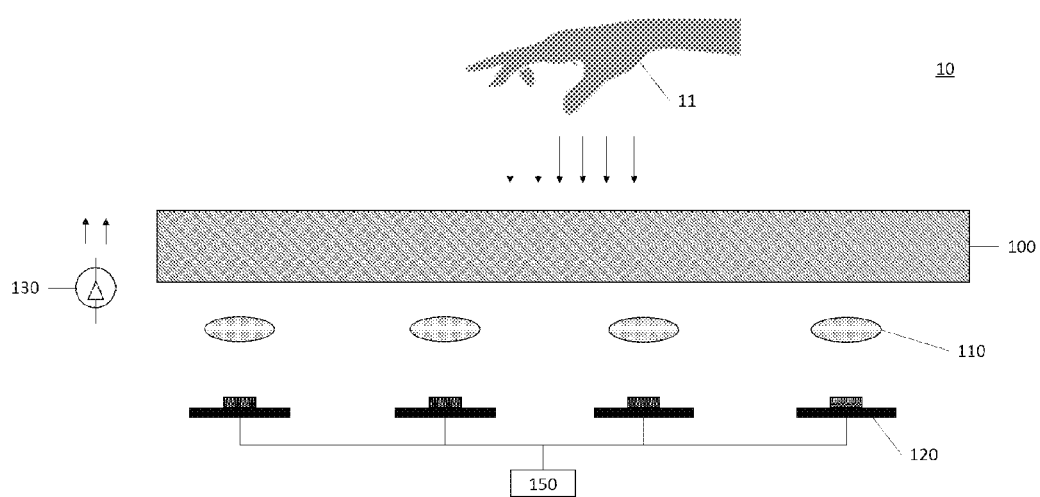
FIG. 2 is a structural schematic diagram of a display device provided by some embodiments of the present disclosure.

FIG. 2 is a structural schematic diagram of a display device 10 provided by some embodiments of the present disclosure. The display device 10 includes a display panel 100, a plurality of liquid crystal lenses 110, a plurality of image sensors 120, and at least one detection light source 130.

As illustrated in FIG. 2, the display panel 100 has a display side and a back side opposite to the display side. The detection light source 130 emits detection light to the display side of the display panel 100 to illuminate a target to be detected, i.e., the target 11, and the emitted detection light is reflected by the target 11 and then irradiated to the display panel 100. The plurality of liquid crystal lenses 110 are in an overlapping arrangement with the plurality of image sensors 120 in one-to-one correspondence on the back side, opposite to the display side, of the display panel 100, and the liquid crystal lenses 110 converge the reflected light from the display side of the display panel 100 and then transmit the light to the corresponding image sensors 120 for imaging, thereby allowing each corresponding image sensor 120 to acquire a partial image (for example, a partial depth image) of the target 11. The display device 10 further can be connected to a processor 150, and the processor 150 is connected to the image sensors 120 and configured to obtain and merge all the partial depth images, acquired by the image sensors 120, related to the target 11, so as to obtain an entire depth image of the target 11. The processor 150 further can be configured to perform analysis calculation on the obtained entire depth image of the target 11 by using a depth algorithm, thereby determining a depth distance of the target 11, so as to implement determining a spatial position of the target 11.

The processor 150 implements corresponding merging and analyzing functions by combining a processing unit having data processing capacity and/or instruction execution capacity with corresponding computer instructions. The processor 150 may be a universal processor, e.g., a central processing unit (CPU) or a graphics processing unit (GPU), and may implement the corresponding functions by executing the computer instructions, and those computer instructions are represented as computer software in logic and form. The processor 150 also may be a specific processor and may implement the corresponding functions by firmware or fixed instructions, e.g., a field programmable gate array (FPGA), an application specific integrated circuit (ASIC), a digital signal processor (DSP), etc.

For example, the target 11 may be a hand of a user, also may be other body parts of the user, or may be a wearable device, or other types of targets to be detected, and the embodiments of the present disclosure are not limited in this aspect.

Figure 3:
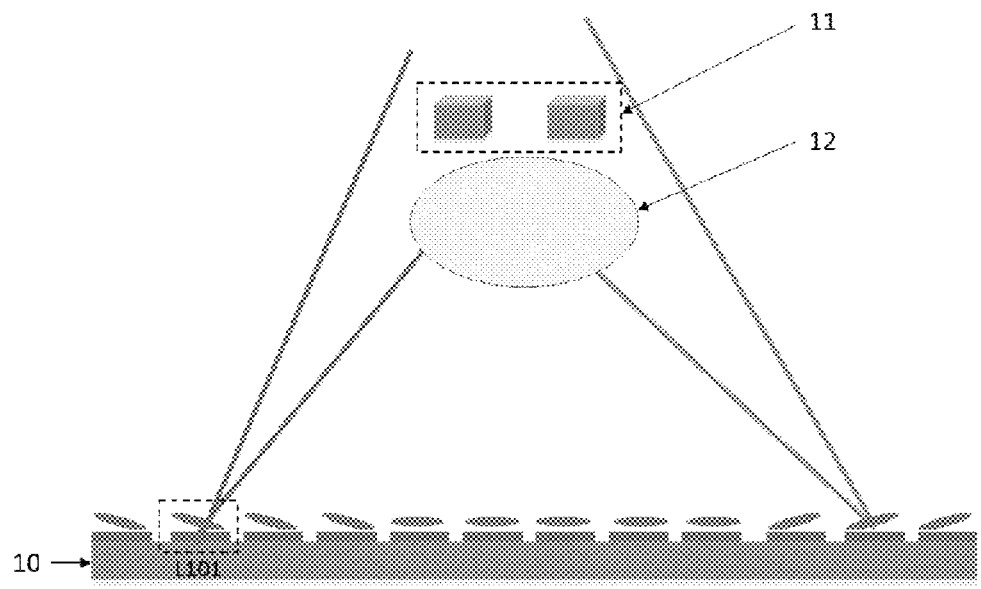
FIG. 3 is a schematic diagram of a display device preventing obstruction provided by some embodiments of the present disclosure.

For example, because of the characteristic of dielectric anisotropy of the liquid crystal, the display device 10 can flexibly control rotation angles of the liquid crystal molecules of the liquid crystal lens 110 by applying different voltages to the liquid crystal lens 110 to change an refractive index of the liquid crystal lens 110, so that the image sensor 120 can receive the depth image information in different directions, thereby greatly increasing the image acquisition range of the image sensor 120 and enabling the image sensor 120 to acquire more accurate depth image information. For example, as illustrated in FIG. 3, when depth image acquisition is performed, if there is an occlusion 12 around the target 11, the light, which is emitted by the target 11 and used for imaging, within an appropriate angle range is blocked by the occlusion 12, and in that case, only light, which is outside the angle range (an incident angle is relatively large) and originally is not used for imaging, is irradiated on the liquid crystal lens 110. Therefore, the display device 10 can apply different voltages to one or a plurality of corresponding liquid crystal lenses 110 to adjust rotation angles of the liquid crystal molecules in the liquid crystal lens 110, and then change the refractive index of the liquid crystal lens 110, so that the light, which is received by the liquid crystal lens 110 and has a relatively large incident angle, reflected by the target 11 can be converged and irradiated to the image sensor 120 for imaging. For example, when the light converged by a first liquid crystal lens L101 is detected to be the light reflected by the occlusion 12, a voltage is applied to the first liquid crystal lens L101 (alternatively, the first liquid crystal lens L101 and the adjacent liquid crystal lens) to adjust rotation angles of the liquid crystal molecules in the first liquid crystal lens L101 to change the refractive index of the first liquid crystal lens L101 until the light reflected by the target 11 is further deflected by the first liquid crystal lens L101, so that the detection light reflected by the target 11 can be accurately transmitted to the corresponding image sensor 120 through the first liquid crystal lens L101 for imaging, thereby avoiding interference on spatial positioning of the target because of the occlusion.

For example, in some embodiments, the plurality of image sensors 120 may be photosensitive image sensors in a form of a single-pixel array. The depth image information acquired by each image sensor 120 is used as one pixel of the entire depth image of the target 11, and then the processor 150 directly merges the depth image information, which is acquired by each image sensor 120, of the corresponding pixels, so as to obtain the entire depth image of the target 11.

Figure 4:
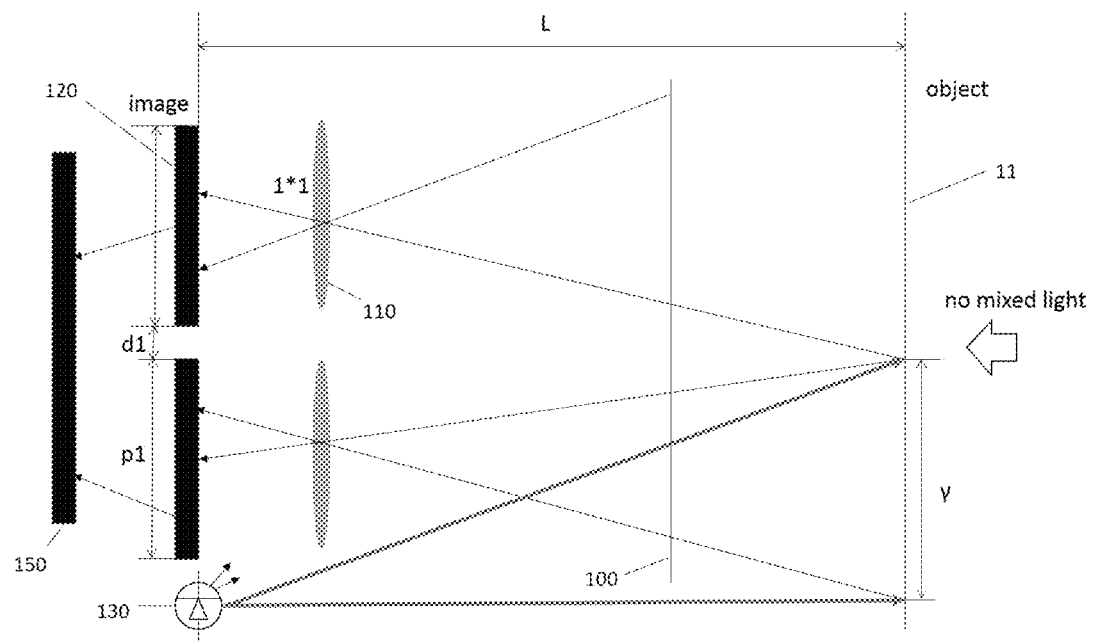
FIG. 4 is an equivalent schematic diagram of determining a spatial position of an image sensor provided by some embodiments of the present disclosure.

FIG. 4 is an equivalent schematic diagram of determining a spatial position of an image sensor 120 in a form of a single-pixel array provided by some embodiments of the present disclosure.

As illustrated in FIG. 4, a plurality of image sensors 120 in the form of the single-pixel array are arranged at an interval of a distance d1, a plurality of liquid crystal lenses 110 and the plurality of image sensors 120 are in one to one correspondence (i.e., in an overlapping arrangement in the direction perpendicular to the surface of the display panel), and the reflected light, which is converged by each liquid crystal lens 110 and is from the target side, does not contains mixed light. The reflected light forms a 1*1 single-pixel image p1 on the corresponding image sensor 120 after passing through the liquid crystal lens 110, so that each of the corresponding image sensors 120 respectively acquires depth image information of one pixel of the target 11. The processor 150 merges the depth image information of all the pixels of the target 11, so as to obtain one entire depth image.

In the display device 10 including the image sensor 120 in the form of the single-pixel array, each liquid crystal lens 110 only converges the reflected light of one single pixel of the target 11, and each image sensor 120 only receives depth image information of a single-pixel size. Therefore, as illustrated in FIG. 4, the interval distance d1 between adjacent image sensors 120 may be set very small, and the number of the image sensors 120 may be very large, so that the display device 10 can cover a large distance range L during depth image acquisition, i.e., the display device 10 also can implement determining a spatial position of a target in a near distance range.

For example, in the detection system using one single large-sized image sensor as illustrated in FIG. 1, one single optical lens can only converge the reflected light in a certain angle range, and therefore, when determining the spatial position of the target in the near distance range, there is an image acquisition blind region, so that the target cannot be detected or the depth distance of the target cannot be accurately obtained. In the display device 10 using the plurality of image sensors 120 in the form of the single-pixel array as illustrated in FIG. 2 to FIG. 4, because the plurality of small liquid crystal lenses 110 are used, the area of the image acquisition blind region is reduced to the greatest extent, so that in a case where rotation angles of the liquid crystal molecules of the liquid crystal lens 110 do not need to be changed, the display device 10 can implement accurate spatial positioning of the target in the near distance range.

For example, in some embodiments, the plurality of image sensors 120 also may be photosensitive image sensors in a form of a multi-pixel array. Each image sensor 120 is configured to acquire a depth image including a plurality of pixels of the target 11, and the depth image, which is acquired by each image sensor 120 and includes a plurality of pixels of the target 11, has an overlapping portion with each other. The processor 150 merges all depth images, which respectively include a plurality of pixels of the target 11, according to the overlapping portion between each depth image including a plurality of pixels, so as to obtain the entire depth image of the target 11.

Figure 5:
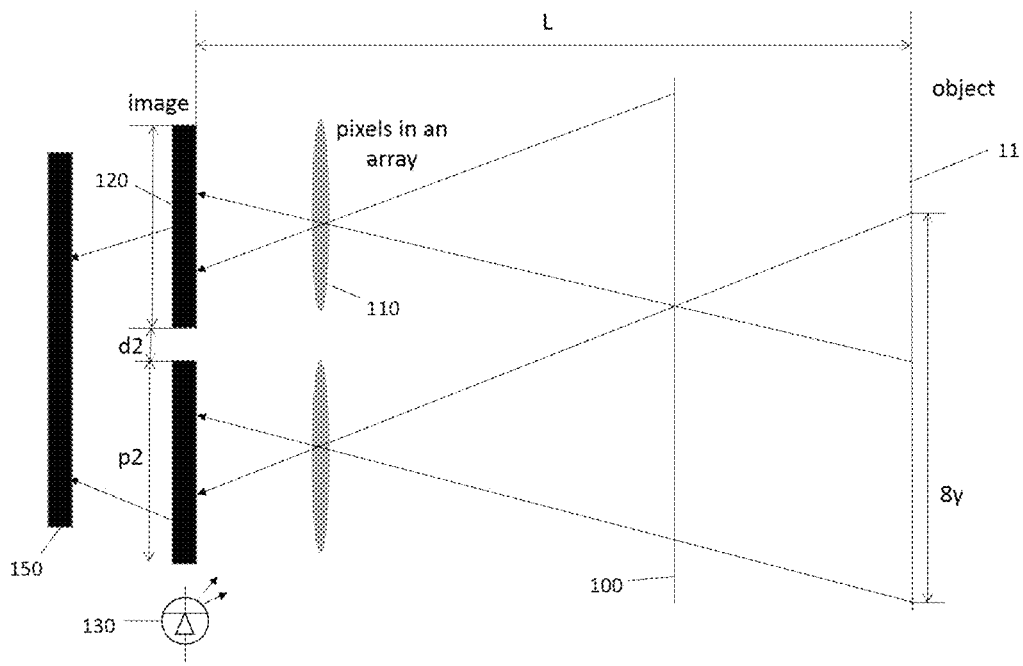
FIG. 5 is another equivalent schematic diagram of determining a spatial position of an image sensor provided by some embodiments of the present disclosure.

FIG. 5 is another equivalent schematic diagram of determining a spatial position of an image sensor 120 in a form of a multi-pixel array provided by some embodiments of the present disclosure. As illustrated in FIG. 5, a plurality of image sensors 120 in the form of the multi-pixel array are arranged at an interval of a distance d2, a plurality of liquid crystal lenses 110 and a plurality of image sensors 120 are in one to one correspondence, and the reflected light, which is converged by each liquid crystal lens 110 and is from the target side, may contain mixed light. The reflected light respectively forms an image p2 including a plurality of pixels (e.g., 8*8) on the corresponding image sensor 120 after passing through the liquid crystal lens 110, so that each corresponding image sensor 120 acquires a partial depth image of the target 11 and each partial depth image has an overlapping portion with each other. The processor 150 merges all the acquired images p2, which respectively include a plurality of pixels, of the target 11 according to the overlapping portion, so as to obtain one entire depth image.

In a case of implementing integration of a plurality of small-sized image sensors with the display screen and ensuring that the target is subjected to accurate spatial positioning in a certain near distance range, compared to the display device 10 including the image sensors 120 in the form of the single-pixel array as illustrated in FIG. 4, the display device 10 including the image sensors 120 in the form of the multi-pixel array reduces the number of the image sensors 120 required in the depth image acquiring process, thereby reducing preparation cost of the display device 10, simplifying the driving process when the display device 10 performs the depth image acquisition operation, and reducing driving power consumption of the display device 10. Moreover, compared to merging image information of a plurality of discrete single pixels, the entire depth image obtained by merging images, which respectively include a plurality of pixels, can have a clearer image effect and a higher image resolution, so that the depth distance of the target can be more accurately determined and a more accurate determination of the spatial position of the target can be implemented. Moreover, because each image sensor 120 in the form of the multi-pixel array has a relatively large photosensitive area, the equivalent lens caliber of the corresponding liquid crystal lens 110 also can be relatively large, so that the quantity of light passing through each liquid crystal lens 110 can be larger, and light intensity of the detection light which the detection light source 130 needs to provide can be accordingly reduced.

For example, as illustrated in FIG. 2, the detection light emitted by the detection light source 130 may be modulated light. For example, the modulated light may be infrared light and for example, may be various types of infrared light, such as near infrared light, mid-infrared light or far infrared light. The infrared light cannot be seen by human eyes, and therefore, the use of the infrared light cannot affect the display operation of the display panel. The detection light source 130, for example, may be an infrared light-emitting diode (LED), an infrared laser diode, or other applicable light sources, and for example, in a case without using the infrared laser diode, the detection light source 130 can be cooperated with an optical component to allow the obtained beam of the infrared light to have better directionality. The embodiments of the present disclosure are not limited in this aspect. The display device 10 may be provided with one or a plurality of detection light sources 130, and the embodiments of the present disclosure are not limited in this aspect. Moreover, for example, when the detection light source 130 emits light, a beam of the detection light can be emitted by using a predetermined frequency, and for example, the flashing frequency of the beam of the detection light may be 10 Hz, 30 Hz, etc., thereby obtaining the modulated light. The photosensitive component of the image sensor 120 may be an infrared photosensitive component or the like, and the embodiments of the present disclosure are not limited in this aspect.

Specific implementation examples of the display device 10 provided by the embodiments as illustrated in FIG. 2 are described in detail below with reference to FIG. 6 to FIG. 8.

Figure 6:
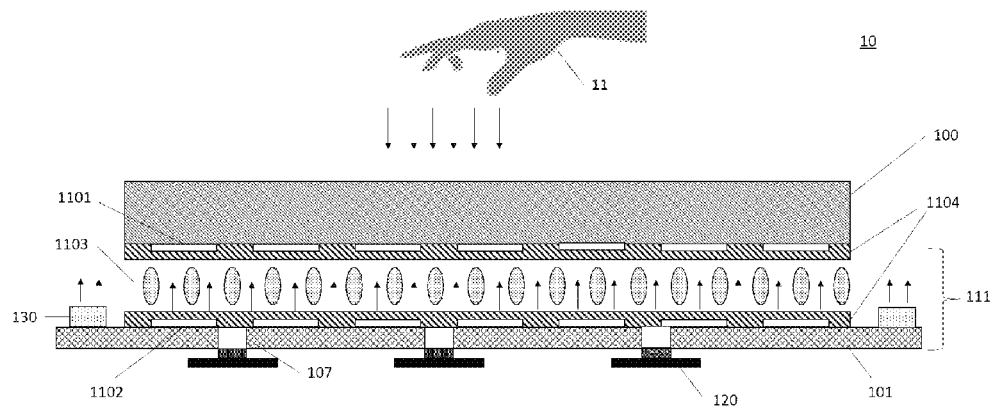
FIG. 6 is a structural schematic diagram of a specific example of a display device provided by some embodiments of the present disclosure.

FIG. 6 is a structural schematic diagram of a specific example of the display device 10 provided by some embodiments of the present disclosure. The display device 10 includes a display panel 100, a liquid crystal panel 111, a plurality of image sensors 120 and at least one detection light source 130, and the liquid crystal panel 111 is used for implementing the plurality of liquid crystal lenses 110 as illustrated in FIG. 2.

The liquid crystal panel 111 is stacked with the display panel 100, and the liquid crystal panel 111 is located on the back side, opposite to the display side, of the display panel 100. The liquid crystal panel 111 includes a first control electrode layer including a plurality of first electrodes 1101, a liquid crystal layer 1103, and a second control electrode layer including a plurality of second electrodes 1102, and the first control electrode layer, the liquid crystal layer 1103, and the second control electrode layer are sequentially stacked. The plurality of first electrodes 1101 are strip electrodes and are parallel to each other, the plurality of second electrodes 1102 are strip electrodes and are parallel to each other, and the plurality of first electrodes 1101 and the plurality of second electrodes 1102 are in one-to-one correspondence. The rotation angles of liquid crystal molecules in the liquid crystal layer 1103 are controlled by different magnitudes of voltages applied to the first electrodes 1101 and/or the second electrodes 1102, so that the refractive indexes of the liquid crystal layer are distributed in a predetermined manner, thereby implementing the lens effect of the plurality of liquid crystal lenses 110. For example, in some other embodiments, the first electrodes 1101 or the second electrodes 1102 can be replaced with planar electrodes, and the planar electrodes can cooperate with a plurality of strip electrodes to implement the lens effect of the plurality of liquid crystal lenses 110. In other embodiments below, the same replacement and arrangement further can be provided. For example, in at least one example, alignment films 1104 are further provided on the surfaces of the first electrodes 1101 and the second electrodes 1102, respectively, for improving the deflection speed of the liquid crystal molecules and improving the response speed of the liquid crystal lens. For example, the alignment film 1104 may be a polyimide (PI) thin film and is rubbed to form numerous tiny channels, so as to allow the liquid crystal molecules to be in alignment, and the embodiments of the present disclosure do not limit the implementation manners of the alignment film.

The liquid crystal panel 111 further includes a first substrate 101, and the first substrate 101 is located on a side, away from the display panel 100, of the liquid crystal panel 111. The plurality of image sensors 120 are located at a plurality of independent positions on the back side of the first substrate 101, and a plurality of first openings 107 are provided on the first substrate 101 corresponding to the plurality of image sensors 120, so that light reflected by the target 11 can be transmitted to the image sensors 120 through the first openings 107 after passing through the liquid crystal layer 1103 and can be imaged on the image sensors 120, thereby allowing the image sensors 120 to acquire depth image information of the target 11.

For example, the detection light sources 130 can be located on the first substrate 101.

For example, in one example, as illustrated in FIG. 6, the area of the first substrate 101 can be slightly greater than the area of the display panel 100, and the detection light sources 130 are located on a side, close to the display panel 100, of the first substrate 101, so that detection light emitted by the detection light sources 130 can be directly irradiated to the target 11, thereby ensuring that optical loss of the detection light can be lower and the requirement for power consumption of the detection light source 130 also can be lower.

Figure 7:
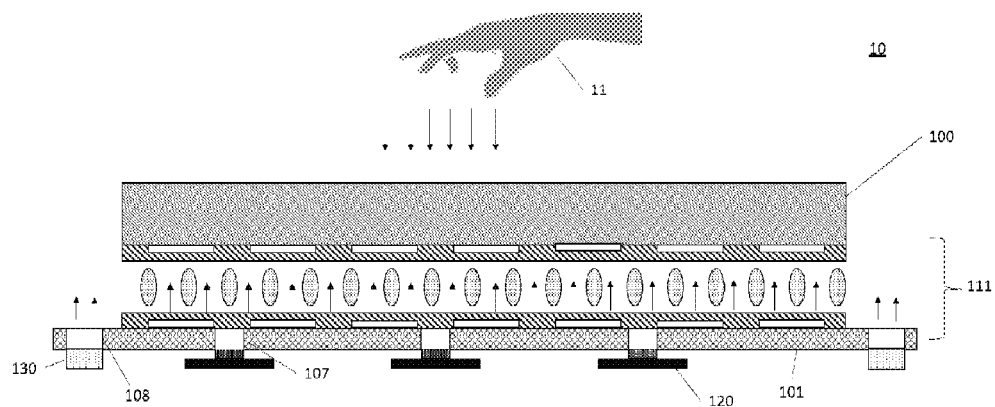
FIG. 7 is a structural schematic diagram of another specific example of a display device provided by some embodiments of the present disclosure.

For example, in another example, as illustrated in FIG. 7, the detection light source 130 also can be located on a side, away from the display panel 100, of the first substrate 101. The detection light emitted by the detection light source 130 needs to pass through the first substrate 101 to illuminate the target 11, and therefore, in order to improve the transmittance of the detection light and reduce the optical loss, a plurality of second openings 108 can be provided on the first substrate 101 corresponding to the detection light sources 130, so that the light emitted by the detection light sources 130 can be irradiated to the display side of the display panel 100 through the second openings 108 to illuminate the target 11.

Figure 8:
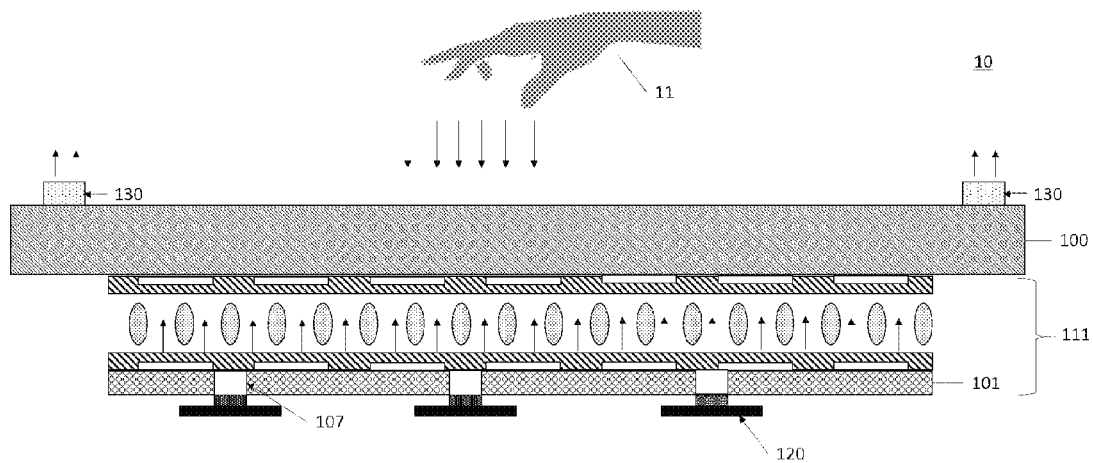
FIG. 8 is a structural schematic diagram of further still another specific example of a display device provided by some embodiments of the present disclosure.

For example, in one example, as illustrated in FIG. 8, the detection light source 130 may be located on the display panel 100. For example, the area of the display panel 100 can be slightly greater than the area of the liquid crystal panel 111, and the detection light source 130 is located on the display side of the display panel 100, so that the light emitted by the detection light source 130 can be more directly irradiated to the target 11, thereby further reducing the optical loss of the detection light and greatly reducing the requirement for the power consumption of the detection light source 130. It should be noted that in the embodiments of the present disclosure, the position of the detection light source 130 is not limited to the above-mentioned cases, the detection light source 130 can be located at any applicable position, and the embodiments of the present disclosure are not limited in this aspect.

The display panel 100 in some embodiments of the present disclosure is a transparent display panel which at least partially allows the detection light to pass through, and for example, may be an organic light-emitting diode (OLED) display panel, a quantum dot light-emitting diode (QLED) display panel, a micro light-emitting diode (MLED) display panel, a liquid crystal display (LCD) panel or other types of display panels. The display panel 100, for example, includes a structure which allows the light, which is irradiated to the display panel 100, from the display side to pass through, and the structure may be such as a transparent portion. For example, the interval portion between display pixels of the OLED display panel is manufactured to be transparent. For example, the LCD display panel is a normally white type, and display pixels of the LCD display panel are transparent when no driving voltage is applied. The embodiments of the present disclosure do not limit the manner of implementing transparent display. The image sensor 120 may be an appropriate type of image sensor, such as a CMOS or charge-coupled device (CCD) type of image sensor. For example, the image sensor 120 may be a silicon-based image sensor, and for example, a preparation manner may be that the image sensor is obtained by cutting after preparing from a mono-crystalline silicon chip. For example, the image sensor 120 also may be an infrared image sensor or a narrowband infrared image sensor configured with an infrared wavelength filter.

In the embodiments of the present disclosure, the display panel 100 is configured to perform display and can allow the detection light reflected by the target 11 to pass through the display panel 100, so as to allow the detection light to reach the liquid crystal lens, provided by the liquid crystal panel 111, located on the back side of the display panel 100 and further to reach the image sensor 120. The liquid crystal layer 1103 of the display device 10 does not need to provide the display effect, and therefore, an active liquid crystal panel or a passive liquid crystal panel can be used.

In the present embodiments, both the plurality of liquid crystal lenses 110 and the plurality of image sensors 120 of the display device 10 are located on the back side of the display panel 100, and therefore, the process of acquiring the depth image of the target 11 does not affect the image display of the display panel 100, and the depth image acquisition operation and the display operation of the display device 10 can be simultaneously performed without mutual interference. Moreover, the light emitted by the display panel 100 during display can be visible light, and light used in the depth image acquisition operation of the display device 10 can be infrared light, so that by using different wavelengths of light, mutual interference between the display operation and the depth image acquisition operation can be further avoided.

In the present embodiments, the liquid crystal panel 111 further includes an opposite substrate (not shown) opposite to the first substrate 101, the liquid crystal layer is disposed between the first substrate 101 and the opposite substrate, and the plurality of second electrodes 1102 and the plurality of first electrodes 1101 are formed on the first substrate 101 and the opposite substrate, respectively. Alternatively, the liquid crystal panel 111 uses the base substrate of the display panel 100 as the opposite substrate (with reference to FIG. 6 to FIG. 8) of the liquid crystal panel 111, and in this case, the plurality of second electrodes 1102 and the plurality of first electrodes 1101 are formed on the first substrate 101 and the opposite substrate, respectively, thereby allowing the thickness of the display device 10 to be thinner.

In some embodiments of the present disclosure, the image sensor 120 and the detection light source 130 can be integrated with the first substrate 101 of the display device 10 in a manner of such as micro-transfer-printing (pTP), surface mount technology (SMT), etc, and also can be implemented by using other applicable processes. The embodiments of the present disclosure are not limited in this aspect, the following embodiments are the same, and details are not described again.

Figure 9:
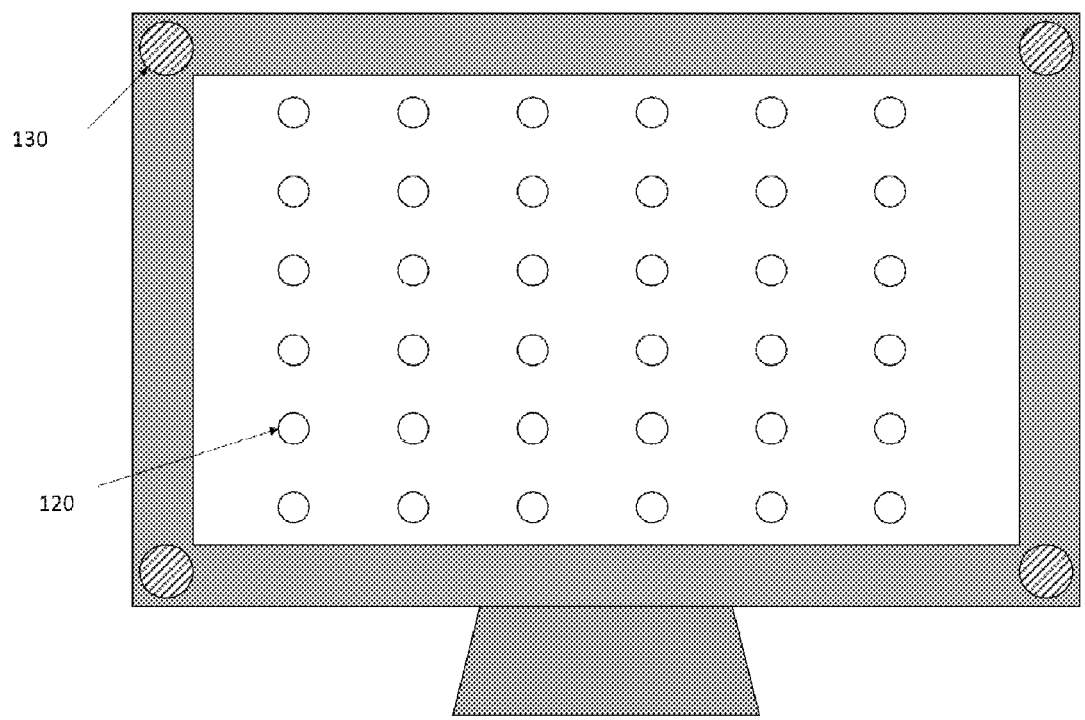
FIG. 9 is a schematic diagram of a planar arrangement of image sensors and detection light sources of a display device provided by some embodiments of the present disclosure.
Figure 10:
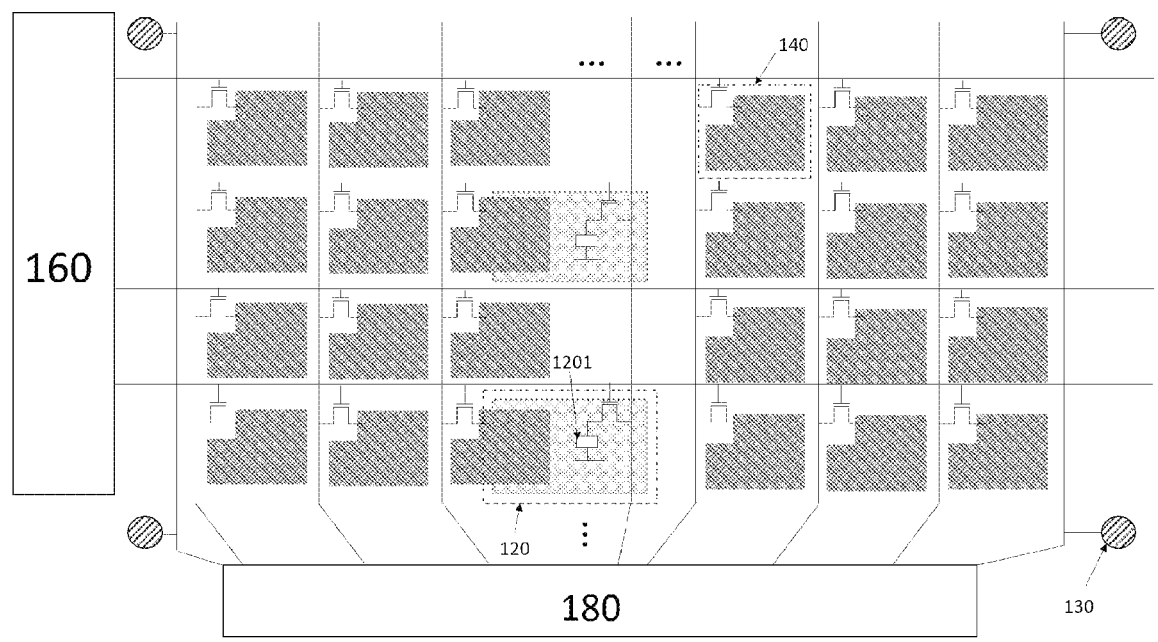
FIG. 10 is a perspective diagram of a partial structure of the display device illustrated in FIG. 9.

FIG. 9 is a schematic diagram of a planar arrangement of image sensors 120 and detection light sources 130 of a display device 10 provided by some embodiments of the present disclosure, and FIG. 10 is a perspective diagram of a partial structure of the display device 10 illustrated in FIG. 9.

In connection with FIG. 9 and FIG. 10, the display device 10 includes a display region and a non-display region around the display region. The display region includes a plurality of pixel units 140 arranged in an array, and the non-display region, for example, may include a gate driving circuit 160 for providing scanning signals to the plurality of pixel units 140, a power management circuit 180 located in the bonding region and used for providing driving voltages to the plurality of pixel units 140, and the like. The power management circuit 180, for example, is a data driving circuit, or an independently provided driving circuit.

For example, the display device 10 includes a plurality of detection light sources 130, and those detection light sources 130 can be arranged in the non-display region of the display device 10 and connected to the power management circuit 180 to obtain the driving voltages, so as to emit the detection light. Certainly, the embodiments of the present disclosure are not limited in this aspect, and the detection light sources 130 also can be connected to an additionally provided control circuit and emit the detection light under control of the control circuit. For example, the non-display region may be the frame region around the display screen.

As illustrated in FIG. 9, the display device 10 is provided with four detection light sources 130 which are respectively arranged at four corners of the frame region around the display screen, so that the detection light emitted by the detection light sources 130 can be irradiated to a very large region range, thereby reducing the preparation cost of the display device 10. In other embodiments which are not illustrated, the display device 10 also can be provided with a plurality of detection light sources 130 which are arranged side by side in the frame region around the display screen, so as to improve light intensity of the emitted detection light, and the embodiments of the present disclosure are not limited in this aspect.

Figure 11:
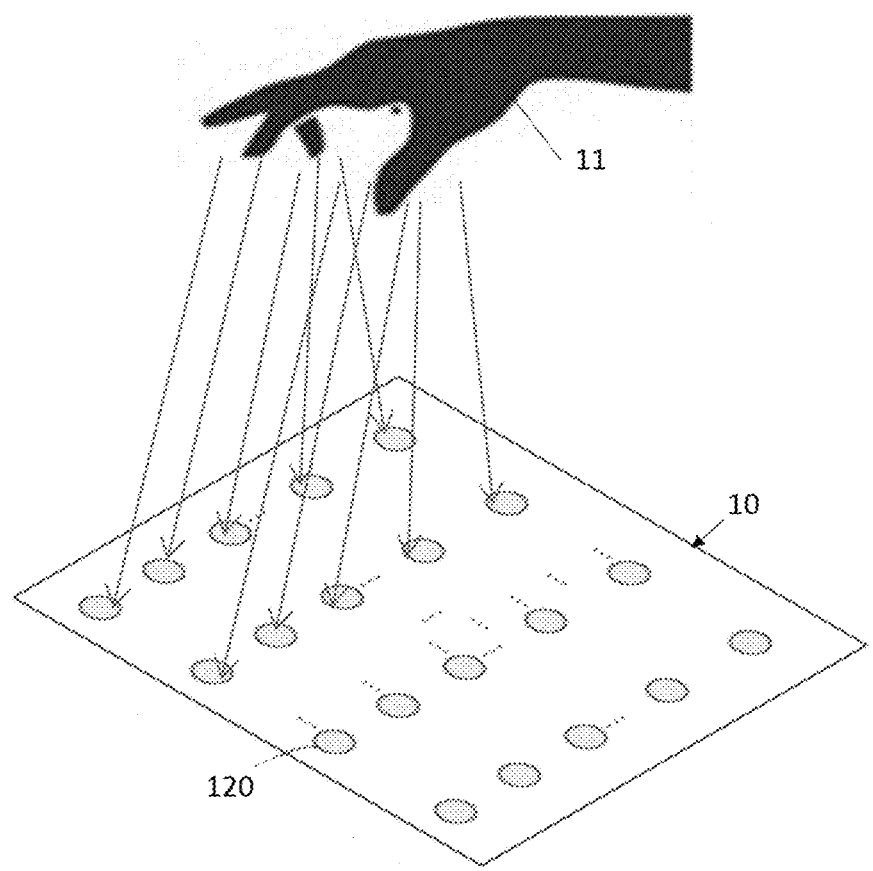
FIG. 11 is a schematic diagram of image acquisition of an image sensor of the display device illustrated in FIG. 9.

For example, the plurality of image sensors 120 can be arranged in the display region of the display device 10 and located on the back side of the pixel units 140, so as not to affect image display of the display device 10. As illustrated in FIG. 10, the display device 10 can provide the driving voltage to the image sensor 120 through the power management circuit 180 and send the control signal to the image sensor 120 through the gate driving circuit 160, so as to allow the image acquisition unit 1201 of the image sensor 120 to work. Certainly, the embodiments of the present disclosure are not limited in this aspect, and the image sensor 120 also may be connected to an additionally provided control circuit and start to work under control of the control circuit. FIG. 11 is a schematic diagram of image acquisition of the image sensor 120 of the display device 10 illustrated in FIG. 9. As illustrated in FIG. 11, where the image sensors 120 are arranged in the display region of the display device 10, the image sensors 120 can have a better image acquisition angle, thereby implementing acquiring accurate depth image information of the target 11.

Figure 12:
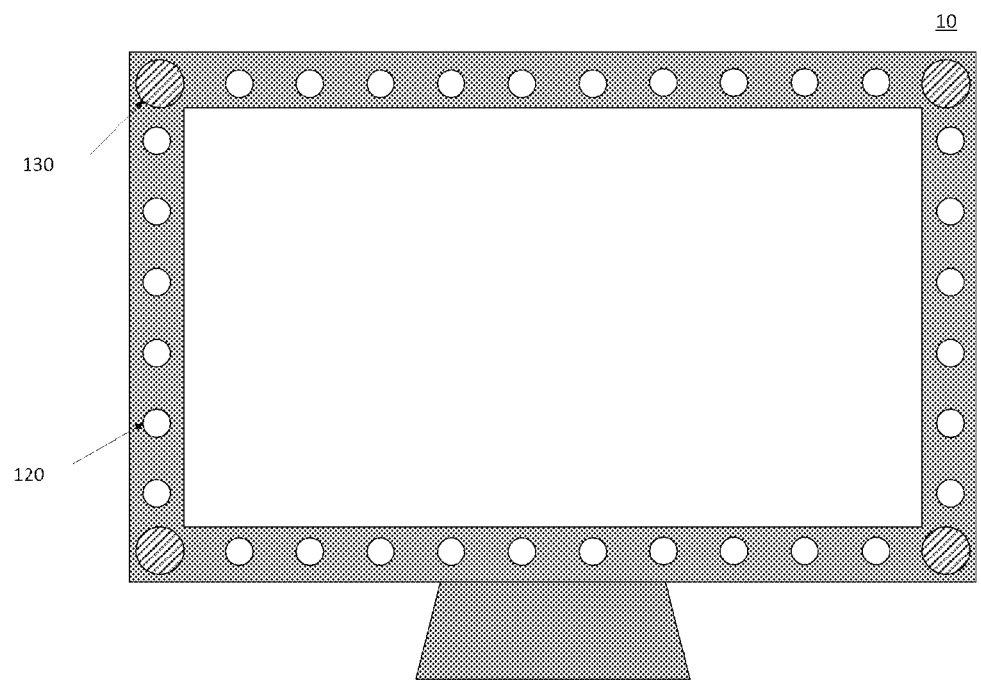
FIG. 12 is a schematic diagram of another planar arrangement of image sensors and detection light sources of a display device provided by some embodiments of the present disclosure.

FIG. 12 is a schematic diagram of another planar arrangement of image sensors 120 and detection light sources 130 of the display device 10 provided by some embodiments of the present disclosure. As illustrated in FIG. 12, part or all of the plurality of image sensors 120 also may be arranged together with the detection light sources 130 in the non-display region of the display device 10. In the present embodiments, the liquid crystal lenses 110 are also correspondingly disposed in the region correspondingly overlapping with the non-display region.

Figure 13:
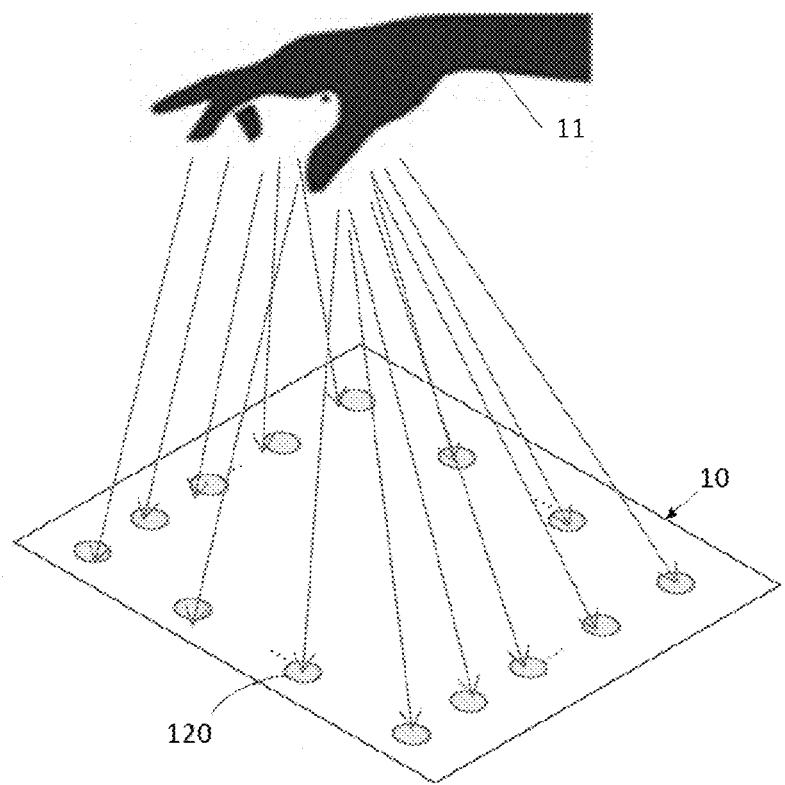
FIG. 13 is a schematic diagram of image acquisition of image sensors of the display device illustrated in FIG. 12.

FIG. 13 is a schematic diagram of image acquisition of image sensors 120 of the display device 10 illustrated in FIG. 12. As illustrated in FIG. 13, where the image sensors 120 are arranged in the non-display region of the display device 10, each image sensor 120 only receives the light reflected by the target 11 in a certain direction, and meanwhile, by changing rotation angles of the liquid crystal molecules of the liquid crystal lens 110 corresponding to the image sensor 120, the image sensor 120 can receive light in different directions, thereby acquiring depth image information in a large spatial range, so that the number of the image sensors 120 of the display device 10 can be greatly reduced and the accuracy of determining the spatial position of the target 11 cannot be affected. Moreover, compared to the planar arrangement of the image sensors 120 as illustrated in FIG. 9, where the image sensors 120 are arranged in the non-display region, the light, which is reflected by the target 11, received by the image sensor 120 does not need to pass through the pixel unit 104 of the display region, and therefore, the light intensity of the reflected light transmitted to the image sensor 120 is higher.

Figure 14:
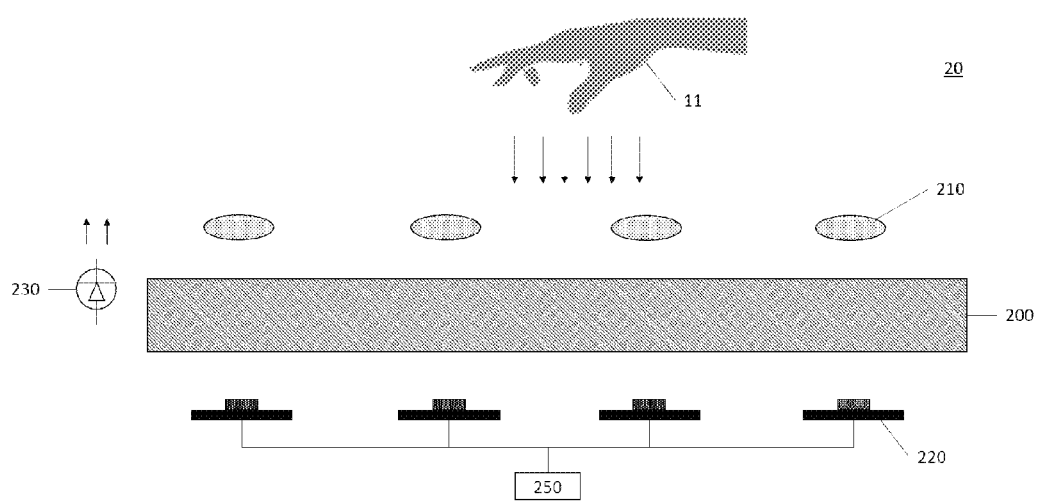
FIG. 14 is a structural schematic diagram of another display device provided by some embodiments of the present disclosure.

FIG. 14 is a structural schematic diagram of another display device 20 provided by some embodiments of the present disclosure, and the display device 20 includes a display panel 200, a plurality of liquid crystal lenses 210, a plurality of image sensors 220 and at least one detection light source 230.

As illustrated in FIG. 14, the detection light source 230 emits detection light to a display side of the display panel 200 to illuminate the target 11 to be detected, and the emitted detection light is irradiated to the display panel 200 after being reflected by the target 11. The plurality of liquid crystal lenses 210 and the plurality of image sensors 220 are arranged on the display side and the back side of the display panel 200, respectively, and are in an overlapping arrangement in one-to-one correspondence. The light reflected by the target 11 is converged through the liquid crystal lens 210 and then transmitted to the corresponding image sensor 220 through the display panel 200 to perform imaging, so that each corresponding image sensor 220 acquires a partial depth image of the target 11. The display device 20 also may be connected to a processor 250, and the processor 250 is connected to the image sensors 220 and configured to obtain and merge all partial depth images acquired by the image sensors 220 and related to the target 11, so as to obtain an entire depth image of the target 11. The processor 250 is further configured to perform analysis calculation on the obtained entire depth image of the target 11 by using a depth algorithm, so as to determine the depth distance of the target 11 to implement determining the spatial position of the target 11.

The liquid crystal lens 210, the image sensor 220 and the detection light source 230 of the display device 20 are basically the same with or similar to the liquid crystal lens 110, the image sensor 120 and the detection light source 130 of the display device 10 illustrated in FIG. 2, respectively, and details are not described herein.

Figure 15:
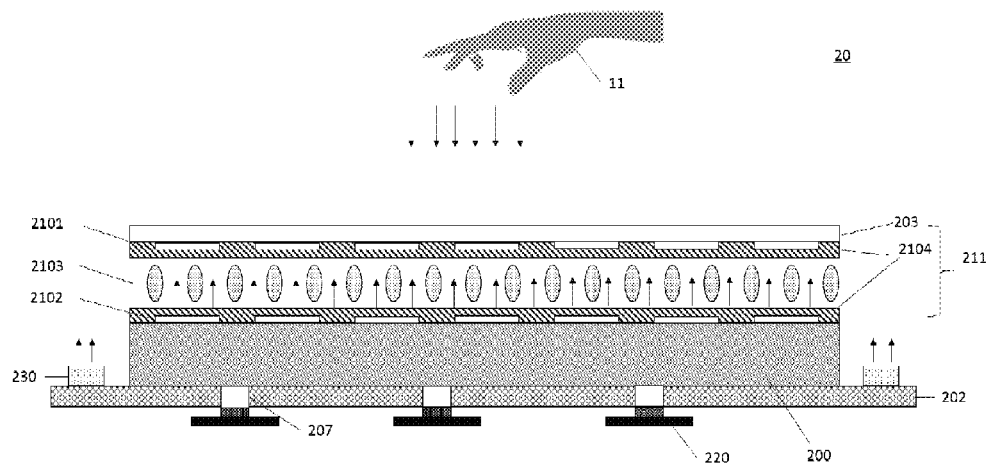
FIG. 15 is a structural schematic diagram of a specific example of a display device provided by some embodiments of the present disclosure.

Specific implementation examples of the display device 20 illustrated in FIG. 14 are described in detail below with reference to FIG. 15 to FIG. 17. FIG. 15 is a structural schematic diagram of a specific example of the display device 20 provided by some embodiments of the present disclosure. The display device 20 includes a display panel 200, a liquid crystal panel 211, a plurality of image sensors 220 and at least one detection light source 230, and the liquid crystal panel 211 is used for implementing the plurality of liquid crystal lenses 210 as illustrated in FIG. 14.

The liquid crystal panel 211 is stacked with the display panel 200 and is located on the display side of the display panel 200. The liquid crystal panel 211 includes a first control electrode layer including a plurality of first electrodes 2101, a liquid crystal layer 2103 and a second control electrode layer including a plurality of second electrodes 2102, and the first control electrode layer, the liquid crystal layer 2103, and the second control electrode layer are sequentially stacked. For example, the plurality of first electrodes 2101 and the plurality of second electrodes 2102 are in one-to-one correspondence, and rotation angles of liquid crystal molecules in the liquid crystal layer 2103 are controlled by applying different magnitudes of voltages to the first electrodes 2101 and the second electrodes 2102, so as to implement the lens effect of the liquid crystal lens 210. For example, alignment films 2104 are further provided on the first electrodes 2101 and the second electrodes 2102, respectively, for improving the deflection speed of the liquid crystal molecules and improving the response speed of the liquid crystal lens.

The display panel 200 further includes a second substrate 202, and the second substrate 202 is located on a side, away from the liquid crystal panel 211, of the display panel 200. The plurality of image sensors 220 are located at a plurality of independent positions on the back side of the second substrate 202, and a plurality of first openings 207 are provided on the second substrate 202 corresponding to the plurality of image sensors 220, so that the light reflected by the target 11 is transmitted to the image sensors 220 through the first openings 207 and performs imaging on the image sensors 220 after passing through the liquid crystal panel 211 and the display panel 200, thereby allowing the image sensors 220 to acquire the depth image information of the target 11.

For example, the liquid crystal panel 211 further may include a third substrate 203, and the third substrate 203 is located on a side, away from the display panel 200, of the liquid crystal panel 211 and is configured to provide protection for the liquid crystal panel 211.

For example, the detection light source 230 may be located on the second substrate 202.

For example, in one example, as illustrated in FIG. 15, the area of the second substrate 202 can be slightly greater than the area of the liquid crystal panel 211, and the detection light source 230 is located on a side, close to the liquid crystal panel 211, of the second substrate 202, so that the detection light emitted by the detection light source 230 can be directly irradiated to the target 11, thereby ensuring that optical loss of the detection light can be lower and the requirement for power consumption of the detection light source 230 also can be lower.

Figure 16:
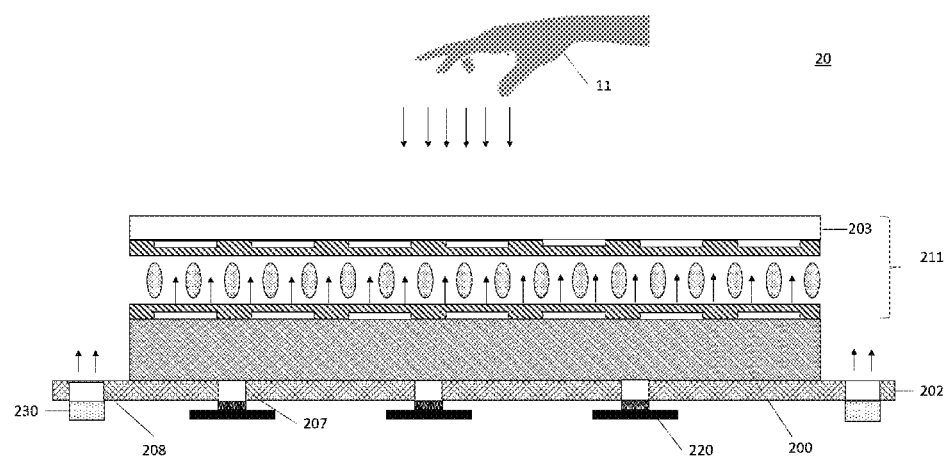
FIG. 16 is a structural schematic diagram of another specific example of a display device provided by some embodiments of the present disclosure.

For example, in another example, as illustrated in FIG. 16, the detection light source 230 also may be located on a side, away from the liquid crystal panel 211, of the second substrate 202. The detection light emitted by the detection light source 230 needs to pass through the second substrate 202, and therefore, in order to improve the transmittance of the detection light and reduce the optical loss, a plurality of second openings 208 are provided on the second substrate 202 corresponding to the detection light sources 230, so that the light emitted by the detection light sources 230 can be irradiated to the display side of the display device 20 through the second openings 208, so as to illuminate the target 11.

Figure 17:
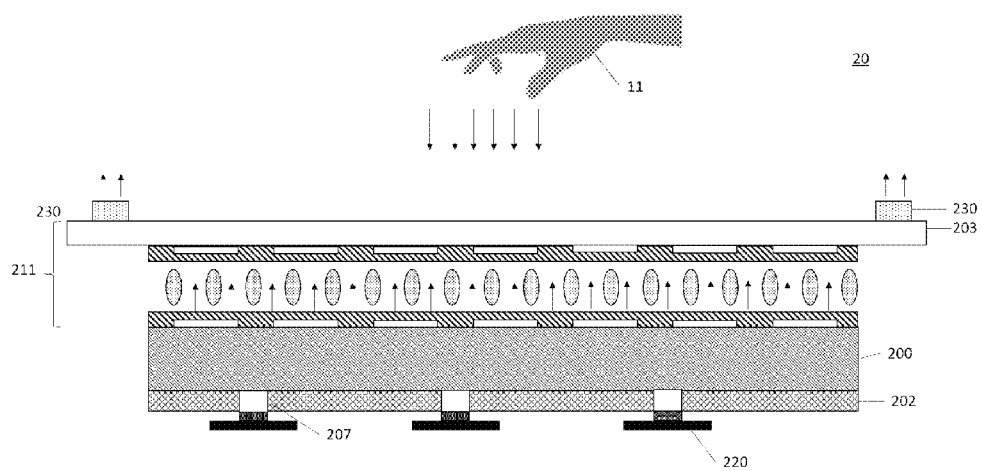
FIG. 17 is a structural schematic diagram of further still another specific example of a display device provided by some embodiments of the present disclosure.

For example, in further still another example, as illustrated in FIG. 17, the detection light source 230 may be disposed on the third substrate 203. For example, the area of the third substrate 203 can be slightly greater than the area of the display panel 200, and the detection light source 230 is disposed on a side, away from the display panel 200, of the third substrate 203, so that the light emitted by the detection light source 230 can be more directly irradiated to the target 11, thereby further reducing the optical loss of the detection light and greatly reducing the requirement for the power consumption of the detection light source 230.

In the present embodiments, the liquid crystal panel 211 further includes an opposite substrate (not shown) opposite to the third substrate 203, the liquid crystal layer is disposed between the third substrate 203 and the opposite substrate, and the plurality of first electrodes 2101 and the plurality of second electrodes 2102 are formed on the third substrate 203 and the opposite substrate, respectively. Alternatively, the liquid crystal panel 211 uses the panel surface of the display panel 200 as the opposite substrate (with reference to FIG. 15 and FIG. 16) of the liquid crystal panel 211, and in this case, the plurality of first electrodes 2101 and the plurality of first electrodes 2102 are respectively formed on the first substrate 101 and the opposite substrate, so that the thickness of the display device 20 can be thinner.

For example, the display panel 200 in the present embodiments may be a self-luminous display panel such as an OLED display panel, a QLED display panel, etc. For example, the OLED display panel may include a base substrate and an opposite substrate, an organic light-emitting display array is formed between the base substrate and the opposite substrate, and the specific structure is not described herein.

In the present embodiments, the planar arrangement positions of the image sensors 220 and the detection light sources 230 of the display device 20 are basically the same with or similar to the planar arrangement positions of the image sensors 120 and the detection light sources 130 of the display device 10 as illustrated in FIG. 9 or FIG. 12, and details are not described herein.

It should be noted that in the present embodiments, where the image sensors 220 of the display device 20 are arranged in the display region of the display device 20, the liquid crystal lenses 210 corresponding to the image sensors 220 are also located in the display region of the display device 20. The liquid crystal lenses 210 of the display device 20 are located on the display side of the display panel 200, and therefore, for example, the depth image acquisition operation and the display operation of the display device 20 need to be performed in a time-sharing manner. When the display device 20 performs image display, rotation angles of the liquid crystal molecules of the liquid crystal lenses 210 need to be controlled to allow the display light emitted by the display panel 200 to pass through, so as to ensure that the image display effect of the display panel 200 is not affected.

In the display device provided by some embodiments of the present disclosure, the display panel, for example, may be a liquid crystal panel, at least part of display pixels of the liquid crystal panel serve as the liquid crystal lenses, and for example, at least part of the pixels can be used for implementing the function of a plurality of liquid crystal lenses and the function of a plurality of display pixels in different phases, respectively.

Figure 18:
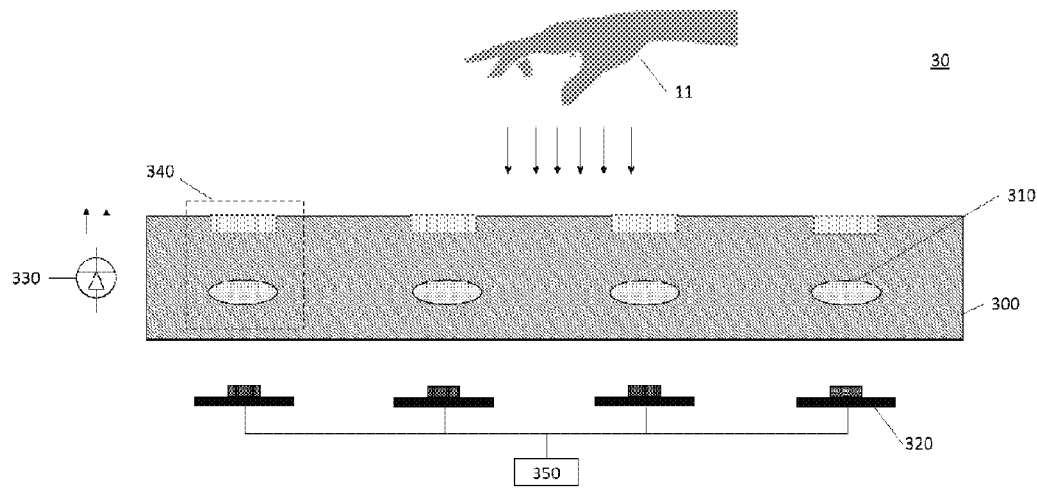
FIG. 18 is a structural schematic diagram of further still another display device provided by some embodiments of the present disclosure.

FIG. 18 is a structural schematic diagram of further still another display device 30 provided by some embodiments of the present disclosure. The display device 30 includes a liquid crystal panel 300, a plurality of image sensors 320 and at least one detection light source 330. The liquid crystal panel 300 includes a first portion and a second portion, the first portion is configured to implement a plurality of liquid crystal lenses 310, and the second portion is configured to implement a plurality of display pixels 340. For example, the first portion also can be used for implementing the plurality of liquid crystal lenses 310 and the plurality of display pixels 340 in different phases, respectively.

As illustrated in FIG. 18, when the display device 30 performs the depth image acquisition operation, the detection light source 330 emits the detection light to the display side of the display device 30 to illuminate the target 11 to be detected, and the emitted detection light is irradiated to the liquid crystal panel 300 after being reflected by the target 11. The plurality of image sensors 320 are located at a plurality of independent positions on the back side of the liquid crystal panel 300, and in this case, the first portion is used for implementing the lens effect of the plurality of liquid crystal lenses 310. The plurality of liquid crystal lenses 310 and the plurality of image sensors 320 of the liquid crystal panel 300 are in an overlapping arrangement in one-to-one correspondence. The light reflected by the target 11 is converged through the liquid crystal lenses 310 and then transmitted to the corresponding image sensors 320 to perform imaging, so that each corresponding image sensor 320 acquires a partial depth image of the target 11. The display device 30 is also connected to a processor 350, and the processor 350 is connected to the image sensors 320 and configured to obtain and merge all partial depth images acquired by the image sensors 320 and related to the target 11, so as to obtain an entire depth image of the target 11. The processor 350 is further configured to perform analysis calculation on the obtained entire depth image of the target 11 by using a depth algorithm, so as to determine the depth distance of the target 11 to implement determining the spatial position of the target 11.

The liquid crystal lens 310, the image sensor 320 and the detection light source 330 of the display device 30 are basically the same with or similar to the liquid crystal lens 110, the image sensor 120 and the detection light source 130 of the display device 10 illustrated in FIG. 2, respectively, and details are not described herein.

Figure 19:
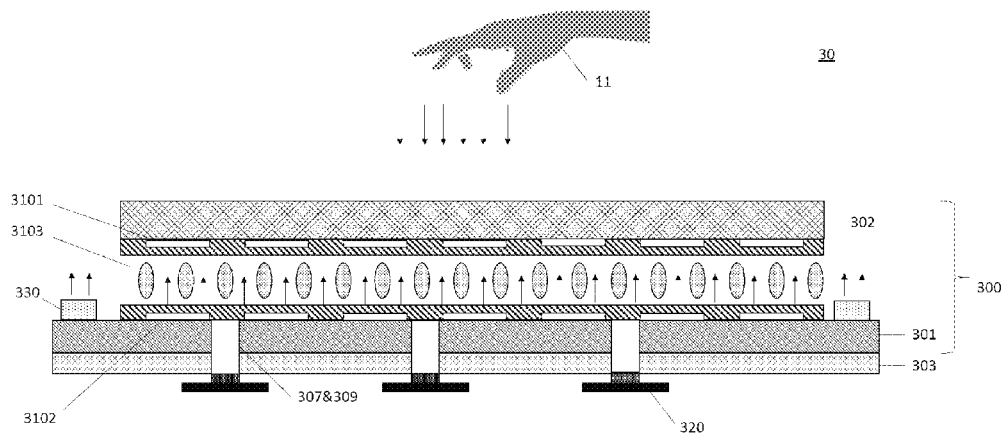
FIG. 19 is a structural schematic diagram of a specific example of a display device provided by some embodiments of the present disclosure.

Specific implementation examples of the display device 30 illustrated in FIG. 18 are described in detail below with reference to FIG. 19 to FIG. 21. FIG. 19 is a structural schematic diagram of a specific example of the display device 30 provided by some embodiments of the present disclosure. The display device 30 includes a liquid crystal panel 300, a backlight source 303, a plurality of image sensors 320 and at least one detection light source 330.

The liquid crystal panel 300 includes a first control electrode layer, a liquid crystal layer 3103, and a second control electrode layer which are sequentially stacked, and alignment films 3104 are arranged on the first control electrode layer and the second control electrode layer, respectively.

In the first portion of the liquid crystal panel 300, the first control electrode layer includes a plurality of first electrodes 3101, the second control electrode layer includes a plurality of second electrodes 3102, and the plurality of first electrodes 3101 and the plurality of second electrodes 3102 are in one-to-one correspondence. When the display device performs the depth image acquisition operation, rotation angles of liquid crystal molecules in the liquid crystal layer 3103 are controlled by applying different magnitudes of voltages to the first electrodes 3101 and the second electrodes 3102, so as to implement the lens effect of the plurality of liquid crystal lenses 310. In some embodiments, when the display device 30 performs the display operation, the rotation angles of the liquid crystal molecules in the liquid crystal layer 3103 are controlled by applying different magnitudes of voltages to the first electrodes 3101 and the second electrodes 3102, so as to implement the display effect of the plurality of display pixels 340, thereby implementing the image display. In this case, the first electrodes 3101 further serve as common electrodes, and the second electrodes 3102 further serve as pixel electrodes. That is, in the present embodiments, the display operation and the depth image acquisition operation of the display device 30 can be respectively performed in different phases by further using the first control electrode layer, the liquid crystal layer, and the second control electrode layer of the display device 30.

In the second portion of the liquid crystal panel 300, the first control electrode layer includes one or a plurality of common electrodes, the second control electrode layer includes a plurality of pixel electrodes, the plurality of pixel electrodes and the plurality of display pixels 340 are in one-to-one correspondence, and the common electrodes correspond to the plurality of pixel electrodes. When the display device 30 performs the display operation, the rotation angles of the liquid crystal molecules in the liquid crystal layer 3103 are controlled by applying different magnitudes of voltages (data voltages) to the common electrodes and the pixel electrodes, so as to implement the display effect of the plurality of display pixels 340, thereby implementing the image display.

The liquid crystal panel 300 further includes a fourth substrate 301 and a fifth substrate 302, and the first control electrode layer including the plurality of first electrodes 3101, the liquid crystal layer 3103, and the second control electrode layer including the plurality of second electrodes 3102 are sequentially stacked between the fourth substrate 301 and the fifth substrate 302. For example, the fourth substrate 301 may be a thin film transistor (TFT) array substrate, and each display pixel 340 is provided with a driving circuit including the thin film transistor. The fifth substrate 302 may be a color filter (CF) substrate, and the CF substrate includes color filter units including such as the red, green, and blue (RGB). The first control electrode layer is located on the fifth substrate 302, and the second control electrode layer is located on the fourth substrate 301.

The backlight source 303 is located on a side, away from the fifth substrate 302, of the fourth substrate 301, and is configured to provide display light to the liquid crystal panel 300. The plurality of image sensors 320 are located at a plurality of independent positions on the back side of the backlight source 303, and a plurality of first openings 307 and a plurality of third openings 309 are respectively provided on the fourth substrate 301 and the backlight source 303 corresponding to the plurality of image sensors 320, so that the light reflected by the target 11 is transmitted to the image sensors 320 through the first openings 307 and the third openings 309 and performs imaging on the image sensors 320 after passing through the liquid crystal layer 3103, thereby allowing the image sensors 320 to acquire depth image information of the target 11.

Figure 22A:
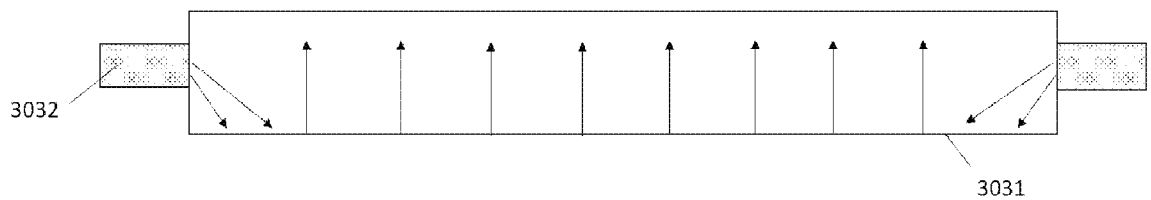
FIG. 22A and FIG. 22B are schematic diagrams of specific examples of a backlight source of the display device illustrated in FIG. 19.
Figure 22B:
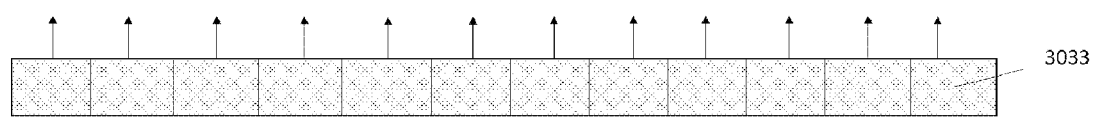

FIG. 22A and FIG. 22B are schematic diagrams of specific examples of the backlight source 303 of the display device 30 illustrated in FIG. 19. For example, in one example, as illustrated in FIG. 22A, the backlight source 303 may be a side-light-emitting backlight source and may include a light guide plate 3031 and a first light source 3032, and the first light source 3032 is located on an incident side of the light guide plate 3031. For example, in another example, as illustrated in FIG. 22B, the backlight source 303 also may be a direct type backlight source including a light source backplane, and the light source backplane includes a plurality of second light sources 3033. For example, the light source backplane may be a backplane of a self-luminous component such as an organic light-emitting diode (OLED) or a quantum dot light-emitting diode (QLED). It should be noted that in the embodiments of the present disclosure, the type of the backlight source 303 is not limited, and may be any type of light source.

For example, the detection light source 330 may be disposed on the fourth substrate 301 and the backlight source 303.

For example, in one example, as illustrated in FIG. 19, the area of the fourth substrate 301 and the area of the backlight source 303 can be slightly greater than the area of the fifth substrate 302, and the detection light source 330 is disposed on a side, close to the fifth substrate 302, of the fourth substrate 301, so that the detection light emitted by the detection light source 330 can be directly irradiated to the target 11, thereby ensuring that the optical loss of the detection light can be lower and the requirement for power consumption of the detection light source 330 also can be lower.

Figure 20:
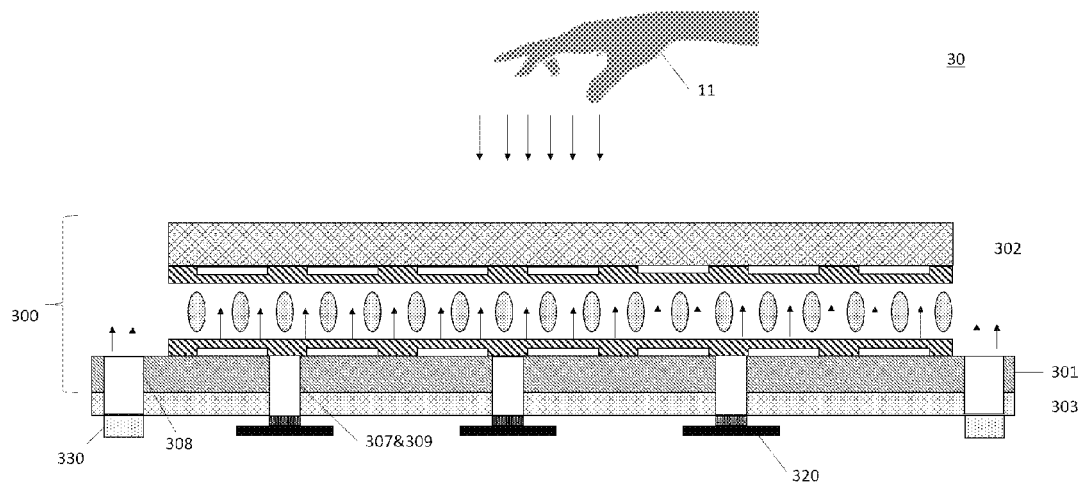
FIG. 20 is a structural schematic diagram of another specific example of a display device provided by some embodiments of the present disclosure.

For example, in another example, as illustrated in FIG. 20, the detection light source 330 also may be located on a side, away from the fifth substrate 302, of the backlight source 303. The detection light emitted by the detection light source 330 needs to pass through the fourth substrate 301 and the backlight source 303, and therefore, in order to improve the transmittance of the detection light and reduce the optical loss, a plurality of second openings 308 need to be provided on the fourth substrate 301 and the backlight source 303 corresponding to the detection light sources 330, so that the light emitted by the detection light sources 330 can be irradiated to the display side of the display device 30 through the second openings 308 to illuminate the target 11.

Figure 21:
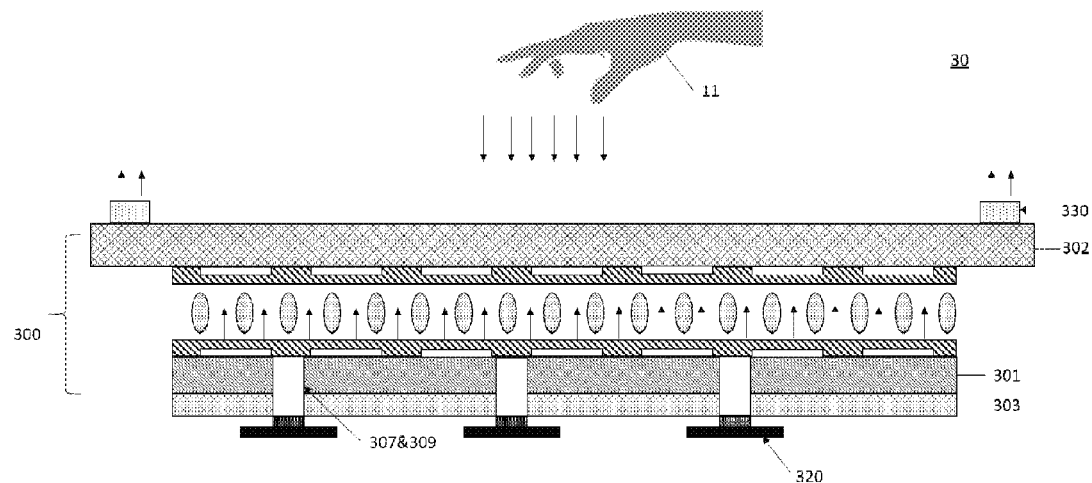
FIG. 21 is a structural schematic diagram of further still another specific example of a display device provided by some embodiments of the present disclosure.

For example, in further still another example, as illustrated in FIG. 21, the detection light source 330 also may be located on the fifth substrate 302. For example, the area of the fifth substrate 302 can be slightly greater than the areas of the fourth substrate 301 and the area of the backlight source 303, and the detection light source 330 is located on a side, away from the fourth substrate 301, of the fifth substrate 302, so that the light emitted by the detection light source 330 can be more directly irradiated to the target 11, thereby further reducing the optical loss of the detection light and greatly reducing the requirement for the power consumption of the detection light source 330.

For example, the liquid crystal panel 300 in the present embodiments may be an LCD panel.

It should be noted that in some embodiments of the present disclosure, the liquid crystal panel 300 of the display device 30 needs to be further used to respectively perform the display operation and the depth image acquisition operation in different phases, and the liquid crystal lenses 310 of the display device 30 needs to be in one-to-one correspondence with the image sensors 320. Therefore, the image sensors 320 of the display device 30 can only be arranged in the display region of the display device 30 and located on the back side of the liquid crystal panel 300, so as not to affect the image display of the display device 30. Meanwhile, the depth image acquisition operation and the display operation of the display device 30 need to be performed in a time-sharing manner. When the display device 30 performs the display operation, liquid crystals of the display device 30 do not provide the effects of the liquid crystal lenses 310, but provide the effects of the display pixels 340, so as to implement image display. The planar arrangement positions of the detection light sources 330 of the display device 30 are basically the same with or similar to the planar arrangement positions of the detection light sources 130 of the display device 10 as illustrated in FIG. 9 or FIG. 12, and details are not described herein.

At least an embodiment of the present disclosure further provides a method for driving a display device, and the method includes: driving at least one liquid crystal lens to transmit light from a selected scene to at least one image sensor which is corresponding, so as to determine a region where the target to be detected is located; and driving a plurality of liquid crystal lenses corresponding to the region where the target to be detected is located to transmit light from the region where the target to be detected is located to a plurality of image sensors which are corresponding, so as to obtain image information of the target to be detected. By using the driving method provided by the present embodiments, integration of the image sensor with the display panel can be implemented, depth image information in different directions can be received, the image acquisition range is large, and accurate spatial positioning of the target to be detected can be implemented.

The driving method is described below by taking the display device 10 illustrated in FIG. 2 as an example.

Figure 23:
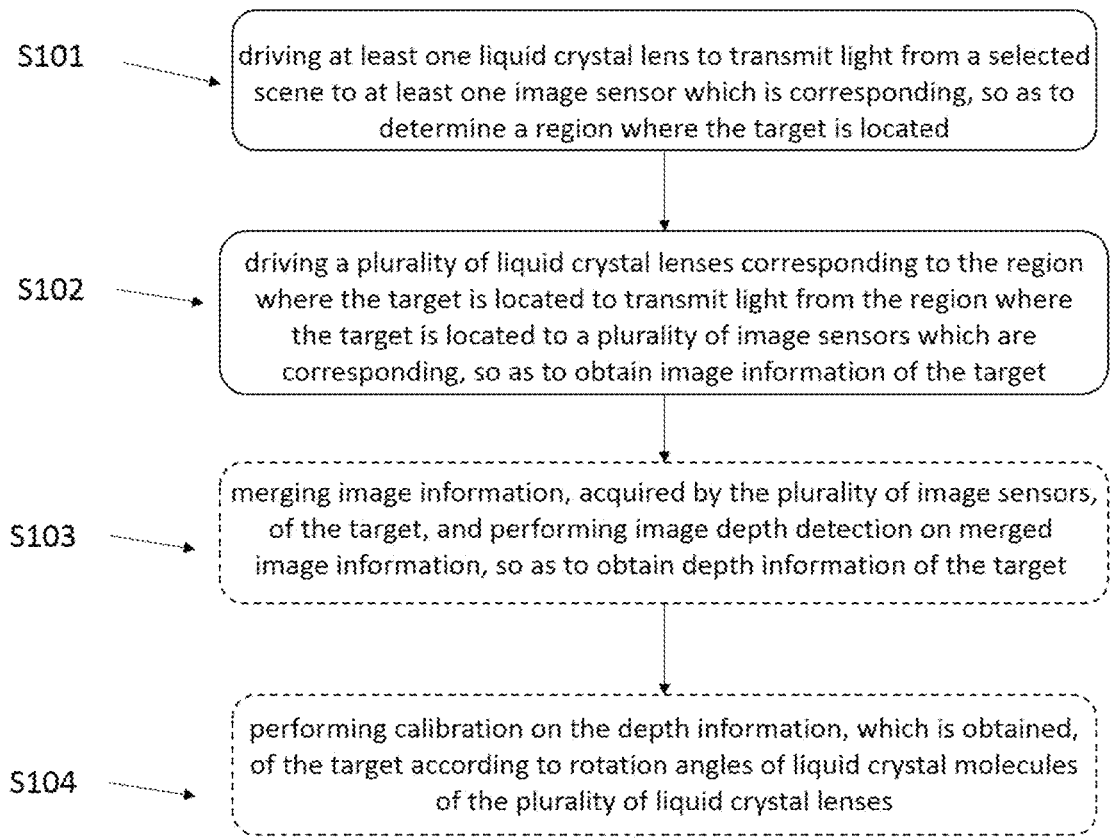
FIG. 23 is a flowchart of a method for driving a display device provided by some embodiments of the present disclosure.

FIG. 23 is a flowchart of a method for driving the display device 10 provided by some embodiments of the present disclosure. The driving method includes Step S101 and Step S102, Step S101, for example, is a rough scanning phase of spatial positioning, and Step S102, for example, is a precise scanning phase of spatial positioning.

Step S101: driving at least one liquid crystal lens 110 to transmit light from a selected scene to at least one image sensor 120 which is corresponding, so as to determine a region where the target 11 (i.e., the target to be detected) is located.

Figure 24:
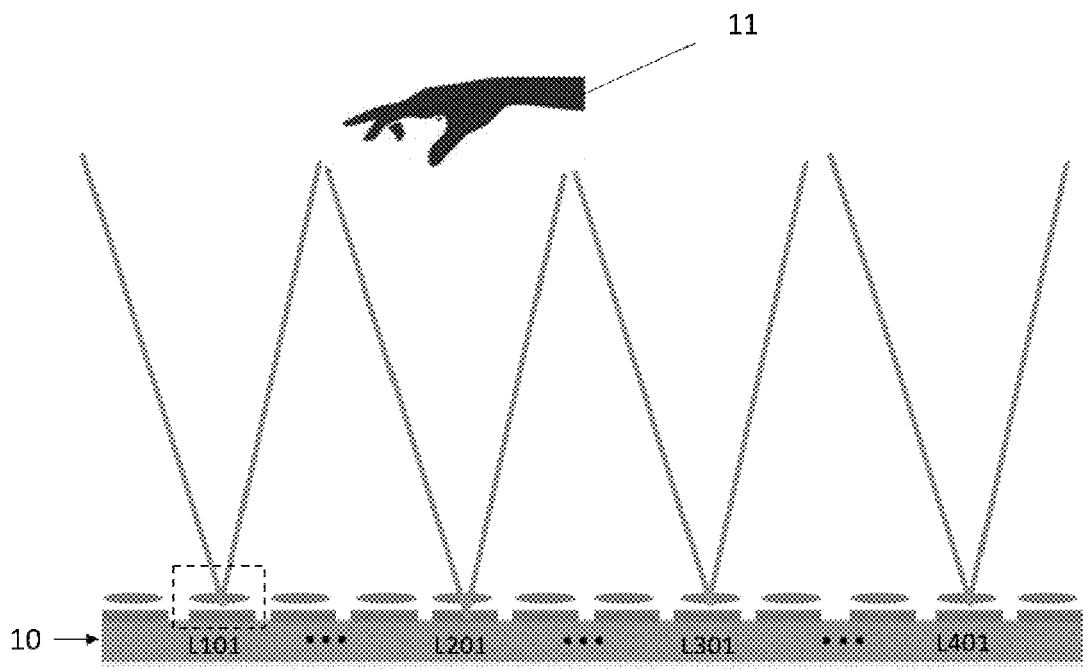
FIG. 24 is a schematic diagram of a rough scanning phase of spatial positioning of step S101 in FIG. 23.

FIG. 24 is a schematic diagram of a rough scanning phase of spatial positioning of step S101 in FIG. 23. As illustrated in FIG. 24, in the rough scanning phase of spatial positioning where Step S101 is performed, for example, the plurality of liquid crystal lenses 110 can be divided into a plurality of groups. For example, liquid crystal lenses L101 to L200 form a first group R1, liquid crystal lenses L201 to L300 form a second group R2, liquid crystal lenses L301 to L400 form a third group R3, etc. In the rough scanning phase of spatial positioning, the display device 10 drives at least one liquid crystal lens in each group, and for example, only the liquid crystal lenses L101, L201, L301, etc. are driven to perform scanning on the display side of the display device 10, so as to determine the region where the target 11 is located.

Step S102: driving a plurality of liquid crystal lenses 110 corresponding to the region where the target 11 is located to transmit light from the region where the target 11 is located to a plurality of image sensors 120 which are corresponding, so as to obtain image information of the target 11.

Figure 25:
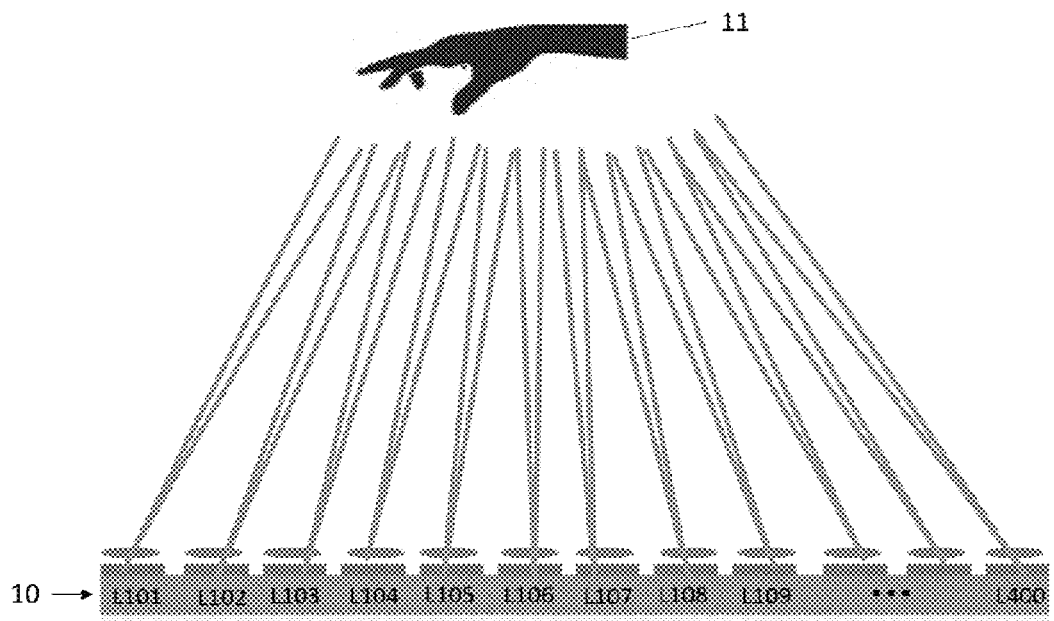
FIG. 25 is a schematic diagram of a precise scanning phase of spatial positioning of step S102 in FIG. 23.

FIG. 25 is a schematic diagram of a precise scanning phase of spatial positioning of step S102 in FIG. 23. As illustrated in FIG. 25, in the precise scanning phase of spatial positioning where Step S102 is performed, after the region where the target 11 is located is determined, all the liquid crystal lenses (e.g., the liquid crystal lenses L101 to L400) of the liquid crystal lens groups (e.g., the first group R1, the second group R2 and the third group R3) corresponding to the region where the target 11 is located are driven to perform scanning on the target 11, so as to allow the plurality of image sensors 120 which are corresponding to acquire the depth image information of the target 11.

In the driving method provided by at least some embodiments of the present disclosure, the depth image acquisition operation of the display device 10 includes two phases of the rough scanning phase and the precise scanning phase, so that in a case of ensuring accurate spatial positioning of the target 11, the number of the image sensors 120 in the display device 10 is further reduced, and the accurate depth image information of the target 11 is acquired by using as few image sensors 120 as possible, thereby implementing high-accuracy spatial positioning.

For example, the method for driving the display device 10 provided by some embodiments of the present disclosure further may include Step S103 and Step S104.

Step S103: merging image information, acquired by the plurality of image sensors 120, of the target 11, and performing image depth detection on merged image information, so as to obtain depth information of the target 11.

Step S104: performing calibration on the depth information, which is obtained, of the target 11 according to rotation angles of liquid crystal molecules of the plurality of liquid crystal lenses 110.

Moreover, for the display device which needs to perform the depth image acquisition operation and the display operation in a time-sharing manner, e.g., the display device 30 as illustrated in FIG. 18. The depth image acquisition operation can be performed prior to the display operation being performed, or the depth image acquisition operation also can be performed subsequent to the display operation being performed. The driving method will be described below by taking the display device 30 illustrated in FIG. 18 as an example.

Figure 26:
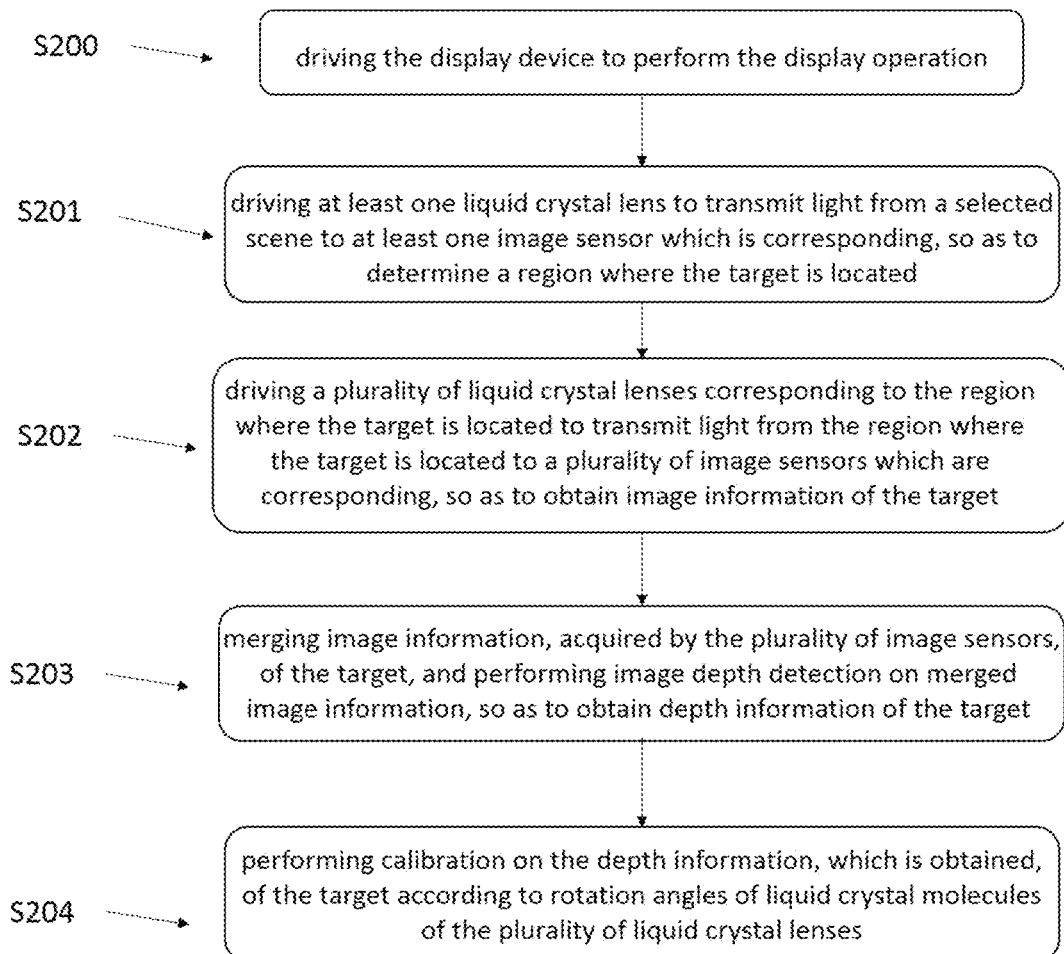
FIG. 26 is a flowchart of another method for driving a display device provided by some embodiments of the present disclosure.

FIG. 26 is a flowchart of another method for driving the display device 30 provided by some embodiments of the present disclosure. As illustrated in FIG. 26, the driving method includes steps S200, S201, S202, S203 and S204, the steps S201 to S204 are basically the same with or similar to the steps S101 to S104 illustrated in FIG. 23, and details are not described herein.

Step S200: driving the display device 30 to perform the display operation. For example, in the display device 30, when Step S200 is performed, liquid crystals of the display device 30 do not provide the effects of the liquid crystal lenses 310, but provide the effects of the display pixels 340, so as to perform the display operation. It should be noted that Step S200 may be performed prior to Step S201 as illustrated in FIG. 26, and also may be performed subsequent to Step S204, and the embodiments of the present disclosure are not limited in this aspect.

The driving method provided by some other embodiments of the present disclosure may include more or fewer steps, and the sequence among each of the steps is not limited and can be determined according to practical requirements. The detailed contents and technical effects related to the driving method can be with reference to the above descriptions related to the display device 10/20/30, and details are not described herein.

At least an embodiment of the present disclosure further provides an electronic device, and the electronic device includes the display device according to any one of the embodiments of the present disclosure. The electronic device can implement integration of the image sensor with the display panel, receive the depth image information in different directions, and have a large image acquisition range, so that accurate spatial positioning of the target can be implemented.

Figure 27:
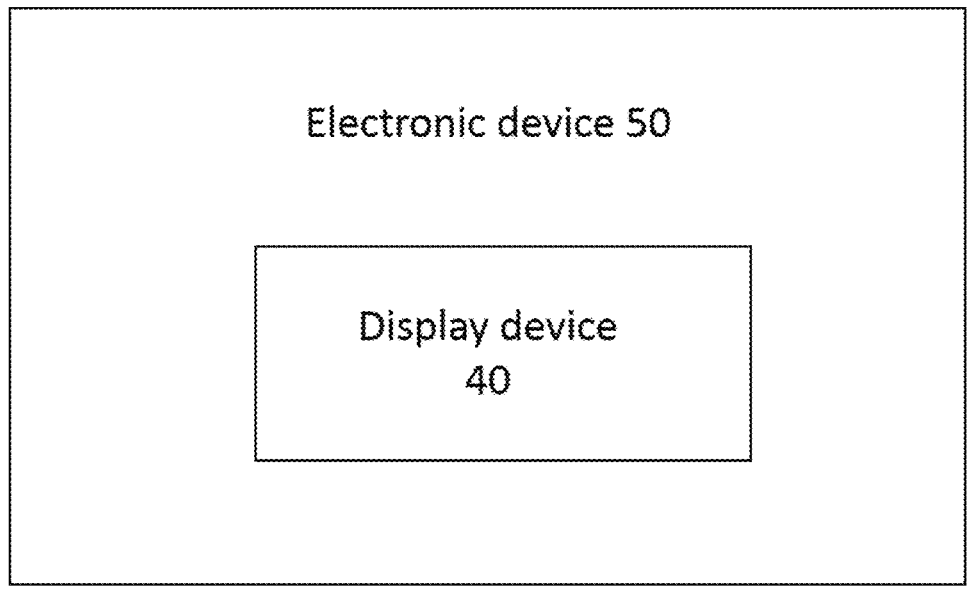
FIG. 27 is a schematic block diagram of an electronic device provided by some embodiments of the present disclosure.

FIG. 27 is a schematic block diagram of an electronic device 50 provided by some embodiments of the present disclosure. The electronic device 50 includes a display device 40, and the display device 40 may be the display device according to any one of the embodiments of the present disclosure. For example, the display device 40 may be the display device 10 as illustrated in FIG. 2, may be the display device 20 as illustrated in FIG. 14, or may be the display device 30 as illustrated in FIG. 18. The technical effects and the implementation principle of the electronic device 50 are basically the same with or similar to those of the display device according to the embodiments of the present disclosure, and details are not described herein. For example, the electronic device 50 may be any product or component having a display function, such as a liquid crystal panel, an electronic paper, an OLED panel, a mobile phone, a tablet computer, a television, a display screen, a notebook computer, a digital photo frame, a navigator, etc., and the embodiments of the present disclosure are not limited in this aspect.

The following statements should be noted:

(1) The accompanying drawings involve only the structure(s) in connection with the embodiment(s) of the present disclosure, and other structure(s) can be referred to common design(s).

(2) In order to clearly illustrate, the thickness of a layer or an area may be enlarged or narrowed in the drawings for describing the embodiments of the present disclosure, that is, the drawings are not drawn in a real scale. It is to be understood that, when a member such as a layer, a film, an area, or a substrate is located or disposed "on" or "below" another member, the member can be located or disposed "on" or "below" the another member "directly", or an intermediate member or intermediate member(s) can be disposed.

(3) In case of no conflict, the embodiments of the present disclosure and features in the embodiments can be combined with each other to obtain new embodiments.

What have been described above are only specific implementations of the present disclosure, the protection scope of the present disclosure is not limited thereto. Any modifications or substitutions easily occur to those skilled in the art within the technical scope of the present disclosure should be within the protection scope of the present disclosure. Therefore, the protection scope of the present disclosure should be based on the protection scope of the claims.

What is claimed is:

1. A display device, comprising a display panel and a plurality of image sensors,
    wherein the display panel has a display side and a back side opposite to the display side,
    the plurality of image sensors are independent at a plurality of independent positions on the back side of the display panel, and the plurality of image sensors are configured to integrally obtain depth image information of a target to be detected on the display side of the display panel;
    the display panel comprises a display region and a non-display region around the display region;
    the plurality of image sensors are arranged in the display region of the display panel, or the plurality of image sensors are arranged in the display region and the non-display region of the display panel;
    the display device further comprises a plurality of liquid crystal lenses; and
    the display device further comprises at least one detection light source, the detection light source is outside the display region of the display device and is configured to emit detection light to a display side of the display device, so as to allow the plurality of image sensors to image based on the detection light reflected by the target to be detected.

2. The display device according to claim 1, wherein each of the plurality of image sensors comprises a plurality of pixel units or one single pixel unit.

3. The display device according to claim 1,
    wherein the plurality of liquid crystal lenses are in an overlapping arrangement with the plurality of image sensors in one-to-one correspondence in a direction perpendicular to a surface of the display side of the display panel, and the plurality of liquid crystal lenses are configured to allow light from outside the display side of the display panel to be transmitted to the plurality of image sensors after passing through the plurality of liquid crystal lenses, respectively.

4. The display device according to claim 3, further comprising a liquid crystal panel,
    wherein the liquid crystal panel comprises the plurality of liquid crystal lenses and is stacked with the display panel,
    the liquid crystal panel is on the display side of the display panel,
    the plurality of image sensors are on a side, away from the liquid crystal panel, of the display panel, and
    in the direction perpendicular to the surface of the display side of the display panel, the display panel is provided with a plurality of first openings corresponding to the plurality of image sensors.

5. The display device according to claim 4, wherein the display panel further comprises a second substrate, and the second substrate is on the side, away from the liquid crystal panel, of the display panel; and
    the detection light source is on a side, close to the liquid crystal panel, of the second substrate, or
    the detection light source is on a side, away from the liquid crystal panel, of the second substrate, and the second substrate comprises a second opening corresponding to the detection light source, so as to allow light emitted by the detection light source to pass through the second opening.

6. The display device according to claim 1, further being connected to a processor,
    wherein the processor is configured to merge image information acquired by the plurality of image sensors, so as to integrally obtain image information of the display side of the display panel.

7. An electronic device, comprising the display device according to claim 1.

8. A method for driving the display device according to claim 1, comprising:
driving at least one liquid crystal lens to transmit light from a selected scene to at least one image sensor which is corresponding, so as to determine a region where the target to be detected is located; and
driving a plurality of liquid crystal lenses corresponding to the region where the target to be detected is located to transmit light from the region where the target to be detected is located to a plurality of image sensors which are corresponding, so as to obtain image information of the target to be detected.

9. The method for driving the display device according to claim 8, further comprising:
driving the display panel to perform a display operation.

10. The method for driving the display device according to claim 8, further comprising:
merging image information, acquired by the plurality of image sensors, of the target to be detected, and performing image depth detection on merged image information, so as to obtain depth information of the target to be detected.

11. The display device according to claim 1, wherein the detection light source is on a surface of the display side of the display device.

12. A display device, comprising a display panel and a plurality of image sensors,
wherein the display panel has a display side and a back side opposite to the display side,
the plurality of image sensors are independent at a plurality of independent positions on the back side of the display panel, and the plurality of image sensors are configured to integrally obtain depth image information of a target to be detected on the display side of the display panel;
the display device further comprises a plurality of liquid crystal lenses,
wherein the plurality of liquid crystal lenses are in an overlapping arrangement with the plurality of image sensors in one-to-one correspondence in a direction perpendicular to a surface of the display side of the display panel, and the plurality of liquid crystal lenses are configured to allow light from outside the display side of the display panel to be transmitted to the plurality of image sensors after passing through the plurality of liquid crystal lenses, respectively;
the display device further comprises a liquid crystal panel, wherein the liquid crystal panel comprises the plurality of liquid crystal lenses and is stacked with the display panel,
the liquid crystal panel is on the back side of the display panel,
the plurality of image sensors are on a side, away from the display panel, of the liquid crystal panel, and
in the direction perpendicular to the surface of the display side of the display panel, the liquid crystal panel is provided with a plurality of first openings corresponding to the plurality of image sensors; and
the display panel comprises a display region and a non-display region around the display region, and
the plurality of image sensors are arranged in the display region of the display panel, or the plurality of image sensors are arranged in the display region and the non-display region of the display panel.

13. The display device according to claim 12, wherein the liquid crystal panel comprises a first control electrode layer, a liquid crystal layer, and a second control electrode layer which are sequentially stacked, and
the first control electrode layer and the second control electrode layer are configured to adjust rotation angles of liquid crystal molecules in the liquid crystal layer, so as to implement a lens effect of the plurality of liquid crystal lenses.

14. The display device according to claim 12, further comprising at least one detection light source,
wherein the detection light source is configured to emit detection light to the display side of the display panel, so as to allow the plurality of image sensors to image based on the detection light reflected by the target to be detected;
the liquid crystal panel further comprises a first substrate, and the first substrate is on the side, away from the display panel, of the liquid crystal panel; and
the detection light source is on a side, close to the display panel, of the first substrate, or
the detection light source is on a side, away from the display panel, of the first substrate, and the first substrate comprises a second opening corresponding to the detection light source, so as to allow light emitted by the detection light source to pass through the second opening.

15. A display device, comprising a display panel and a plurality of image sensors,
wherein the display panel has a display side and a back side opposite to the display side,
the plurality of image sensors are independent at a plurality of independent positions on the back side of the display panel, and the plurality of image sensors are configured to integrally obtain depth image information of a target to be detected on the display side of the display panel;
the display device further comprises a plurality of liquid crystal lenses,
wherein the plurality of liquid crystal lenses are in an overlapping arrangement with the plurality of image sensors in one-to-one correspondence in a direction perpendicular to a surface of the display side of the display panel, and the plurality of liquid crystal lenses are configured to allow light from outside the display side of the display panel to be transmitted to the plurality of image sensors after passing through the plurality of liquid crystal lenses, respectively; and
the display panel is one liquid crystal panel,
the liquid crystal panel comprises a first portion configured to implement the plurality of liquid crystal lenses, and a second portion configured to implement a plurality of display pixels, and
in the direction perpendicular to the surface of the display side of the display panel, the liquid crystal panel is provided with a plurality of first openings corresponding to the plurality of image sensors.

16. The display device according to claim 15, wherein at least part of the display pixels of the liquid crystal panel serve as the liquid crystal lenses.

17. The display device according to claim 15, wherein the first portion of the liquid crystal panel comprises a first control electrode layer, a liquid crystal layer, and a second control electrode layer which are sequentially stacked, and the first control electrode layer and the second control electrode layer are configured to adjust rotation angles of liquid crystal molecules in the liquid crystal layer, so as to implement a lens effect of the plurality of liquid crystal lenses.

18. The display device according to claim 15, further comprising at least one detection light source,
wherein the detection light source is configured to emit detection light to a display side of the display device, so as to allow the plurality of image sensors to image based on the detection light reflected by the target to be detected; and
the detection light source is on the display side of the display device, or
the detection light source is on the back side of the liquid crystal panel, and in the direction perpendicular to the surface of the display side of the display panel, the liquid crystal panel comprises a second opening corresponding to the detection light source, so as to allow light emitted by the detection light source to pass through the second opening.

19. The display device according to claim 15, further comprising a backlight source,
wherein the backlight source is configured to provide display light to the liquid crystal panel,
the plurality of image sensors are on a back side, opposite to the display side of the display panel, of the backlight source, and in the direction perpendicular to the surface of the display side of the display panel, the backlight source comprises a plurality of third openings corresponding to the plurality of image sensors.

* * * * *